United States Patent
Zhang et al.

(10) Patent No.: US 12,323,361 B2
(45) Date of Patent: Jun. 3, 2025

(54) QUASI-CO-LOCATION INFORMATION OBTAINING METHOD, COMMUNICATION NODE AND STORAGE MEDIUM

(71) Applicant: ZTE Corporation, Guangdong (CN)

(72) Inventors: Shujuan Zhang, Guangdong (CN); Zhaohua Lu, Guangdong (CN); Jianwei Wang, Guangdong (CN); Bo Gao, Guangdong (CN); Huahua Xiao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 419 days.

(21) Appl. No.: 17/759,033

(22) PCT Filed: Jan. 18, 2021

(86) PCT No.: PCT/CN2021/072477
§ 371 (c)(1),
(2) Date: Jul. 18, 2022

(87) PCT Pub. No.: WO2021/143901
PCT Pub. Date: Jul. 22, 2021

(65) Prior Publication Data
US 2023/0052764 A1    Feb. 16, 2023

(30) Foreign Application Priority Data
Jan. 17, 2020  (CN) .................. 202010054515.5

(51) Int. Cl.
*H04L 5/00*   (2006.01)
*H04W 72/23*  (2023.01)

(52) U.S. Cl.
CPC .......... *H04L 5/0053* (2013.01); *H04L 5/0048* (2013.01); *H04L 5/0094* (2013.01); *H04W 72/23* (2023.01)

(58) Field of Classification Search
CPC ................ H04L 5/0053; H04L 5/0048; H04L 5/0094; H04L 1/0026; H04L 1/189; H04L 5/0023;
(Continued)

(56) References Cited

U.S. PATENT DOCUMENTS 12,021,781 B2 *  6/2024  Matsumura ........... H04L 5/0094
2019/0174466 A1  6/2019  Zhang et al.
(Continued)

FOREIGN PATENT DOCUMENTS

CN   108199819 A   6/2018
CN   110391890 A   10/2019
(Continued)

OTHER PUBLICATIONS

European Search Report issued in EP Patent Application No. 21742001.7, dated May 25, 2023, 8 pages.
(Continued)

*Primary Examiner* — Rownak Islam
(74) *Attorney, Agent, or Firm* — Perkins Coie LLP

(57) ABSTRACT

Provided are a quasi-co-location information obtaining method, communication node and storage medium. The method of obtaining quasi-co-location information, including: acquiring, by a communication node based on first information, a number x and/or a determination mode of quasi-co-location reference signal sets of a first element; where the first information includes at least one of: information indicated in a downlink control channel that schedules the first element; the number of quasi-co-location reference signal set corresponding to a predetermined codepoint in a transmission configuration indicator (TCI) state mapping table; the number of CORESET group; the maximum number of quasi-co-location reference signal sets corresponding to one codepoint in the TCI state mapping table; or a number of time domain repetition of the first
(Continued)

element; the number of quasi-co-location reference signal sets corresponding to a second element.

20 Claims, 4 Drawing Sheets

(58) Field of Classification Search
CPC .... H04L 1/08; H04W 72/23; H04W 72/0446; H04W 72/0453
USPC ........................................................ 370/329
See application file for complete search history.

(56) References Cited

U.S. PATENT DOCUMENTS

| | | |
|---|---|---|
| 2020/0007294 A1 | 1/2020 | Yang et al. |
| 2020/0145159 A1* | 5/2020 | Tsai ..................... H04L 5/0051 |
| 2021/0044403 A1 | 2/2021 | Zhang et al. |
| 2022/0021495 A1 | 1/2022 | Zhang et al. |
| 2022/0174712 A1 | 6/2022 | Zhang et al. |
| 2022/0408470 A1* | 12/2022 | Jung ..................... H04W 72/23 |

FOREIGN PATENT DOCUMENTS

| | | |
|---|---|---|
| CN | 110535545 A | 12/2019 |
| CN | 110535598 A | 12/2019 |

OTHER PUBLICATIONS

ZTE, "On single PDCCH design for multi-TRP and multi-panel," 3GPP TSG RAN WG1 #97, Reno, USA, R1-1906241, 5 pages, May 13-17, 2019.
International Search Report and Written Opinion for International Application No. PCT/CN2021/072477, mailed Apr. 8, 2021 (8 pages).
Chinese search report issued in CN Patent Application No. 202010054515.5, dated Nov. 19, 2024, 1 page.

* cited by examiner

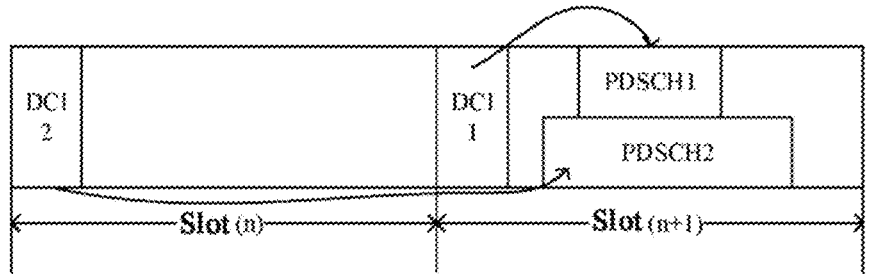
FIG.1
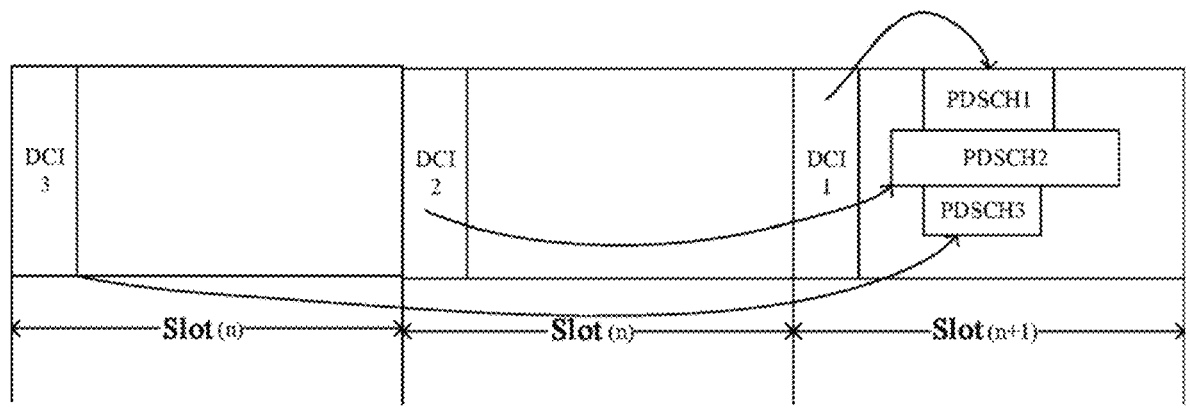
FIG.2
FIG.3
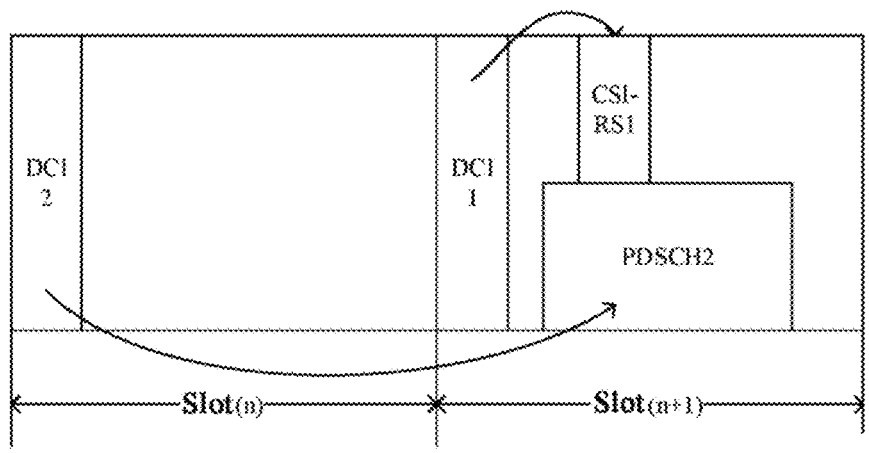
FIG.4

QUASI-CO-LOCATION INFORMATION OBTAINING METHOD, COMMUNICATION NODE AND STORAGE MEDIUM

The present application is a U.S. National Stage Application of PCT Application Serial No. PCT/CN2021/072477, filed Jan. 18, 2021, which claims priority to Chinese patent application NO. 202010054515.5 filed with the CNIPA on Jan. 17, 2020, the disclosures of which are incorporated herein in their entireties by reference.

FIELD

The present disclosure relates to the field of wireless communication networks, such as, a quasi-co-location information obtaining method, communication node and storage medium.

BACKGROUND

In high-frequency beam communications, when an interval between a physical downlink control channel (PDCCH) that schedules aperiodic channel state information reference signal (AP-CSI-RS)/physical downlink shared channel (PDSCH) and the AP-CSI-RS/PDSCH is less than a predetermined threshold, a quasi-co-location reference signal of the AP-CSI-RS/PDSCH is determined according to a default quasi-co-location reference signal set. However, when there are more than one default quasi-co-location reference signal sets, the AP-CSI-RS/PDSCH with a scheduling interval less than the predetermined threshold is constantly transmitted by more than one default quasi-co-location reference signal sets, resulting in resource waste. Moreover, there lacks a clear definition for how the various determination modes of the default quasi-co-location reference signal are selected.

SUMMARY

The present disclosure provides a quasi-co-location information obtaining method, communication node and storage medium, which can obtain related information of the quasi-co-location reference signal set and avoid resource waste.

Embodiments of the present disclosure propose a method of obtaining quasi-co-location information, including the following:

A communication node acquires based on first information, a number x and/or a determination mode of quasi-co-location reference signal sets of a first element.

The first information includes at least one of the following: information indicated in a downlink control channel that schedules the first element; the number of quasi-co-location reference signal sets corresponding to a predetermined codepoint in a transmission configuration indicator (TCI) state mapping table; the number of CORESET group; the maximum number of quasi-co-location reference signal sets corresponding to one codepoint in the TCI state mapping table; a number of time domain repetition of the first element; and the number of quasi-co-location reference signal sets corresponding to a second element.

A time interval between the downlink control channel that schedules the first element and the first element is less than a predetermined threshold; the first element includes at least one of a channel and signal; a time domain intersection between the second element and the first element is non-empty; the second element includes at least one of an element having a scheduling interval greater than the predetermined threshold, a periodic element, a semi-persistent element, CORESET, a channel and signal; x is a positive integer greater than or equal to 1.

Embodiments of the present disclosure provide a communication node, including: a processor configured to, when executing a computer program, implement the method according to any embodiment.

Embodiments of the present disclosure also provide a computer-readable storage medium stored with a computer program, wherein the computer program, when executed by a processor, implements the method according to any embodiment.

BRIEF DESCRIPTION OF THE DRAWINGS

FIG. 1 illustrates a flow diagram of a method of obtaining quasi-co-location information according to an embodiment of the present disclosure;

FIG. 2 illustrates a schematic diagram of time domain resources occupied by the first element and the second element according to an embodiment of the present disclosure;

FIG. 3 illustrates a schematic diagram of time domain resources occupied by the first element and a plurality of second elements according to an embodiment of the present disclosure;

FIG. 4 illustrates a further schematic diagram of time domain resources occupied by the first element and the second element according to an embodiment of the present disclosure;

DETAILED DESCRIPTION OF EMBODIMENTS

Figure 5:
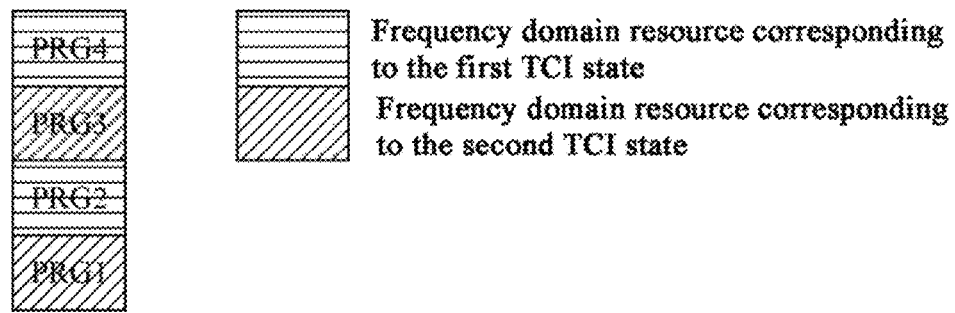
FIG. 5 illustrates a schematic diagram in which different frequency domain resource groups of the PDSCH respectively correspond to different TCI states of the x TCI states according to an embodiment of the present disclosure.

Embodiments of the present disclosure are described in details below with reference to the drawings.

"And/or" mentioned throughout the embodiments of the present disclosure refers to any and all combinations of one or more related listed items. The terms "first" and "second" in the specification, claims and drawings of the present disclosure are provided to distinguish different objects, rather than limiting a specific order.

In high-frequency beam communications, if Transmission Configuration Indicator (TCI) state information indicated in PDCCH that schedules AP-CSI-RS/PDSCH is to be used for receiving of AP-CSI-RS/PDSCH, it is required that a time interval between the PDCCH that schedules AP-CSI-RS/PDSCH and the AP-CSI-RS/PDSCH should be greater than or equal to a predetermined threshold because it takes a given period of process time for both decoding of the PDCCH and switching of a received beam in accordance with the TCI state information indicated by the PDCCH. As such, the current protocol stipulates: if an interval between the PDCCH that schedules the AP-CSI-RS/PDSCH and the AP-CSI-RS/PDSCH is less than a predetermined threshold, quasi-co-location reference signals of AP-CSI-RS/PDSCH are determined using a default quasi-co-location reference signal set. However, when there are more than one default quasi-co-location reference signal sets, the AP-CSI-RS/PDSCH with a scheduling interval less than the predetermined threshold is constantly transmitted using more than one default quasi-co-location reference signal sets, resulting in resource waste and complicated detection algorithm of the terminal device. According to the method described by the present disclosure, the number of quasi-co-location reference signals of an element having a scheduling interval less than the predetermined threshold is determined as required without increasing the signaling overheads, so as to reduce interference and enhance system performance.

Embodiments of the present disclosure propose a mobile communication network (including but not limited to the Fifth Generation Mobile Communication Network (5-th Generation, 5G)). Network architecture of the network may include devices at network side (e.g., one or more types of base stations, transmission nodes, Access Point (AP), relay, Node B, Universal Terrestrial Radio Access (UTRA), Evolved Universal Terrestrial Radio Access (EUTRA) and terminal device (User Equipment (UE), user equipment data card, relay, mobile device etc.). In the embodiments of the present disclosure, there is provided a quasi-co-location information obtaining method, communication node and storage medium that can run on the above network architecture, to obtain information related to the quasi-co-location reference signal set and avoid wasting resources.

Besides, the quasi-co-location information obtaining method provided by the embodiments of the present disclosure may also solve the problems including the following:

1. How to determine the receiving of AP-CSI-RS with a scheduling interval less than the predetermined threshold in a multi-node transmission.

2. Currently, there are multiple ways to determine the default quasi-co-location reference signal set of the PDSCH having a scheduling interval less than the predetermined threshold. How to determine the time for using different quasi-co-location reference signal sets. Without using additional signaling, a determination method most suitable for the current scenario can be reasonably selected from the multiple ways for determining the default quasi-co-location reference signal set.

3. In cross-carrier scheduling and multi-node transmission, how the quasi-co-location reference signals of the AP-CSI-RS/PDSCH having a scheduling interval less than the predetermined threshold are acquired.

The quasi-co-location information obtaining method, the communication node and their technical effects are described below.

FIG. 1 illustrates a schematic flow of a quasi-co-location information obtaining method according to one embodiment. As shown in FIG. 1, the method provided by the embodiment is applicable to communication nodes. The method includes the following:

S110: the communication node acquires, based on first information, a number x and/or a determination mode of quasi-co-location reference signal set of a first element.

The first information includes at least one of the following: information indicated in a downlink control channel that schedules the first element; the number of quasi-co-location reference signal set corresponding to a predetermined codepoint in a transmission configuration indicator (TCI) state mapping table; the number of CORESET group; the maximum number of quasi-co-location reference signal set corresponding to one codepoint in the TCI state mapping table; the number of time domain repetition of the first element; and the number of quasi-co-location reference signal sets corresponding to a second element.

A time interval between the downlink control channel that schedules the first element and the first element is less than a predetermined threshold; the first element includes at least one of a channel and signal; a time domain intersection between the second element and the first element is non-empty; the second element includes at least one of an element having a scheduling interval greater than the predetermined threshold, a periodic element, a semi-persistent element, a CORESET, a channel and signal; x is a positive integer greater than or equal to 1.

In an embodiment, in the case that the communication node obtains the number x of quasi-co-location reference signal set of the first reference element based on the first information, the x quasi-co-location reference signal sets of the first element belong to a first set, the first set includes any one of: a set composed of y quasi-co-location reference signal sets corresponding to the predetermined codepoint; and a set composed of y quasi-co-location reference signal sets corresponding to the second element. y is a positive integer greater than or equal to 1, or y is a positive integer greater than or equal to x.

In an embodiment, the x quasi-co-location reference signal sets of the first element include any one of: first x quasi-co-location reference signal sets of the y quasi-co-location reference signal sets; an intersection between the y quasi-co-location reference signal sets and a quasi-co-location reference signal set indicated in the downlink control channel that schedules the first element; and a quasi-co-location reference signal set in the y quasi-co-location reference signal sets meets a predetermined feature. A quasi-co-location relation is met between a quasi-co-location reference signal associating with a spatial receiving parameter in the quasi-co-location reference signal set meeting the predetermined feature and a first quasi-co-location reference signal. The first quasi-co-location reference signal is a quasi-co-location reference signal associating with a spatial receiving parameter in the quasi-co-location reference signal set indicated for the first element in the downlink control channel that schedules the first element.

In an embodiment, when the first set includes y quasi-co-location reference signal sets corresponding to the predetermined codepoint, the first element meets at least one of: the downlink control channel that schedules the first element is located in a different frequency bandwidth from the first element; and the maximum number of quasi-co-location reference signal set corresponding to one codepoint in the TCI state mapping table is greater than 1.

In an embodiment, the communication node acquires the number x of quasi-co-location reference signal set of the first reference element based on the number of CORESET group, including: x is equal to 1 when the number of CORESET group is greater than 1; or x is less than or equal to the maximum number of quasi-co-location reference signal sets corresponding to one codepoint in the TCI state mapping table when the number of CORESET group is equal to 1.

In an embodiment, the communication node acquires, based on the number of the time domain repetition of the first element, the number x and/or a determination mode of quasi-co-location reference signal sets of the first element, including at least one of: the communication node acquires values of the x for a first transmission opportunity set and a second transmission opportunity set respectively; the communication node determines the same value of the x corresponding to a first transmission opportunity set and a second transmission opportunity set; the communication node determines different determination modes of quasi-co-location signal set for a first transmission opportunity set and a second transmission opportunity set; the communication node determines the same determination modes of quasi-co-location signal set for a first transmission opportunity set and a second transmission opportunity set; the communication node corresponds a quasi-co-location reference signal set for a first transmission opportunity set and a second transmission opportunity set respectively; and the communication node determines the same quasi-co-location reference signal set corresponding to a first transmission opportunity set and a second transmission opportunity set.

A number of time domain repetition of the first element is greater than 1, and a domain repetition transmission opportunity includes the first transmission opportunity set and the second transmission opportunity set; a time interval between a starting time domain symbol of each transmission opportunity in the first transmission opportunity set and the downlink control channel that schedules the first element is less than the predetermined threshold; a time interval between a starting time domain symbol of each transmission opportunity in the second transmission opportunity set and the downlink control channel that schedules the first element is greater than or equal to the predetermined threshold.

In an embodiment, in case that a determination mode in which the communication node acquires, based on first information, a quasi-co-location reference signal set of the first element, the first information further includes at least one of: whether a CORESET is configured in a frequency bandwidth where the first element is located; and whether the downlink control channel that schedules the first element is located in a different frequency bandwidth from the first element.

In an embodiment, a determination mode for the quasi-co-location reference signal set of the first element includes at least one of: acquiring, in a frequency bandwidth where the first element is located, a quasi-co-location reference signal set of the first element based on a quasi-co-location reference signal of a CORESET having the lowest CORESET-ID among CORESETs associating with a detected search space in a slot closest to the first element; acquiring the quasi-co-location reference signal set of the first element based on a quasi-co-location reference signal of a CORESET having the lowest CORESET-ID in a time unit closest to the first element among time units containing CORESET with a predetermined features; the CORESET with the predetermined features includes: the CORESET in a frequency bandwidth where the first element is located, the CORESET in a CORESET group that includes a CORESET where a downlink control channel that schedules the PDSCH/AP-CSI-RS is located, and the CORESET associating with a detected search space in the time unit; and acquiring the quasi-co-location reference signal set of the first element based on a quasi-co-location reference signal set corresponding to the predetermined codepoint in the TCI state mapping table, where the TCI state mapping table is a TCI state mapping table in the frequency bandwidth where the first element is located, or the TCI state mapping table is a TCI state mapping table corresponding to a CORESET group where a downlink control channel that schedules the first element is located.

In an embodiment, in the case that the downlink control channel that schedules the first element is in a different frequency bandwidth from the first element, the communication node determines that x quasi-co-location reference signal sets of the first element belong to a quasi-co-location reference signal set corresponding to a predetermined codepoint in the TCI state mapping table, if the frequency bandwidth where the first element is located is configured without CORESET; and the communication node determines, based on the first information, x quasi-co-location reference signal sets of the first element, if the frequency bandwidth where the first element is located is configured with CORESET.

In an embodiment, the communication node determines, based on the first information, x quasi-co-location reference signal sets of the first element, including at least one of the following: the communication node determines the x quasi-co-location reference signal sets based on the maximum number z of quasi-co-location reference signal sets corresponding to one codepoint in the TCI state mapping table and/or the number d of CORESET groups in a frequency bandwidth where the first element is located; when d is equal to 1 and z is equal to 1, the communication node determines the x quasi-co-location reference signal sets based on a quasi-co-location reference signal set of CORESET meeting a first predetermined feature; when d is equal to 1 and z is greater than 1, the communication node determines the x quasi-co-location reference signal sets based on one or more quasi-co-location reference sets in a quasi-co-location reference signal set corresponding to a predetermined codepoint in the TCI state mapping table; when d is greater than 1, the communication node determines the x quasi-colocation reference signal sets based on a quasi-co-location reference signal set of CORESET meeting a second predetermined feature;

the CORESET having the first predetermined feature includes a CORESET having lowest CORESET index in a CORESET group associated with a detected search space in a time unit closest to the first element, the CORESET being located in the same frequency bandwidth with the first element; and the CORESET having the second predetermined feature includes a CORESET having lowest CORESET index in a CORESET group associated with a detected search space and belonging to a predetermined CORESET in a time unit closest to the first element, the CORESET being located in the same frequency bandwidth with the first element.

In an embodiment, the first element meets at least one of following: the downlink control channel that schedules the first element is located in a frequency bandwidth different from the downlink control channel of the first element; when the first element includes a measurement reference signal, a time domain symbol where the first element is located excludes the second element; when the first element includes a measurement reference signal, configuration information of the first element includes quasi-co-location reference signals associating with a spatial receiving parameter; a list of quasi-co-location reference signal set configured in a frequency bandwidth where the first element is located at least includes a quasi-co-location reference signal set that includes a quasi-co-location reference signal associating with a spatial receiving parameter; a list of quasi-co-location reference signal set activated in a frequency bandwidth where the first element is located at least includes a quasi-co-location reference signal set that includes a quasi-co-location reference signal associating with a spatial receiving parameter; a list of quasi-co-location reference signal set correspondingly activated by a predetermined CORESET group in a frequency bandwidth where the first element is located at least includes a quasi-co-location reference signal set that includes a quasi-co-location reference signal associating with a spatial receiving parameter;

a list of quasi-co-location reference signal set of PDSCH activated in a frequency bandwidth where the first element is located at least includes a quasi-co-location reference signal set that includes a quasi-co-location reference signal associating with a spatial receiving parameter; and a list of quasi-co-location reference signal set of PDSCH correspondingly activated by a predetermined CORESET group in a frequency bandwidth where the first element is located at least includes a quasi-co-location reference signal set that includes a quasi-co-location reference signal associating with a spatial receiving parameter.

In an embodiment, the TCI state mapping table satisfies at least one of following features: the TCI state mapping table corresponding to a frequency bandwidth where the first element is located; the TCI state mapping table corresponding to a CORESET group where a downlink control channel that schedules the first element is located; and a TCI state set consisting of TCI states included in the TCI state mapping table includes at least one TCI state containing quasi-co-location reference signals associating with a spatial receiving parameter.

In an embodiment, the method further includes: the communication node determines x quasi-co-location reference signal sets of the first element according to any one of following determinations: determining whether a TCI state set included in a TCI state mapping table corresponding to a frequency bandwidth where the first element is located includes one TCI state, the one TCI state containing quasi-co-location reference signals associating with a spatial receiving parameter; if no, x quasi-co-location reference signal sets of the first element are acquired based on x quasi-co-location reference signal sets indicated in that downlink control channel that schedules the first element; and if yes, x quasi-co-location reference signal sets of the first element could not be acquired based on x quasi-co-location reference signal sets indicated in the downlink control channel that schedules the first element, or x quasi-co-location reference signal sets indicated in the downlink control channel that schedules the first element belong to the predetermined set.

In an embodiment, the communication node acquires, based on information indicated in the downlink control channel that schedules the first element, the number x of quasi-co-location reference signal set of the first element, including at least one of: when the first element is a channel, the communication node determines the number x of quasi-co-location reference signal set of the first element based on a transmission configuration indication TCI indicator domain in the downlink control channel of the first element; and when the first element represents a measurement reference signal, the communication node determines the number x of quasi-co-location reference signal set of the first element based on a first codepoint indicated in a TCI indicator domain obtained from a request domain in the downlink control channel of the first element.

In an embodiment, the predetermined codepoint includes any one of following codepoint: the lowest codepoint in a codepoint which corresponds to the maximum number of quasi-co-location reference signal set in the TCI state mapping table; the lowest codepoint in a codepoint which corresponds to the minimum number of quasi-co-location reference signal set in the TCI state mapping table; the lowest codepoint in a codepoint which corresponds to the maximum number of quasi-co-location reference signal set in the TCI state mapping table, corresponding quasi-co-location reference signal set including a quasi-co-location reference signal set of predetermined CORESET; codepoint 0; the predetermined codepoint and a codepoint indicated by a TCI indicator domain in a downlink control channel that schedules the first element are two independent codepoints; and the predetermined codepoint is not acquired according to a TCI indicator domain in a downlink control channel that schedules the first element.

In an embodiment, the method further includes: the communication node determines a transmission mode of the first element based on the x. The transmission mode includes a mapping relationship between x quasi-co-location reference signal sets of the first element and parameters of the first element, where parameters of the first element include at least one of: a frequency domain resource, a time domain resource, a Demodulation Reference Signal (DMRS) ports, and a repetition transmission opportunity.

In an embodiment, the CORESET group meets at least one of the following: a CORESET of the CORESET group is located in the frequency bandwidth where the first element is located; the CORESET group includes a CORESET where the downlink control channel that schedules the first element is located; CORESET of the CORESET group is located in the frequency bandwidth that schedules the first element; the number of CORESER group is the number of CORESER group in the frequency bandwidth where the first element is located; and the number of CORESER group is the number of CORESER group in the frequency bandwidth where the downlink control channel that schedules the first element is located.

Some example implementations are listed below for elaborating a quasi-co-location information obtaining method provided in FIG. 1 according to embodiments of the present disclosure. The example implementations below may be executed independently or in combination. Embodiments of the present disclosure are not specifically restricted in this regard.

First Example Embodiment

In this embodiment, the number x of TCI state of the PDSCH is acquired based on a first codepoint indicated by the TCI indicator domain in the PDCCH, and a TCI state index of the PDSCH is acquired according to x TCI states out of y TCI states corresponding to a second codepoint, where x and y are positive integers greater than or equal to 1 and y is greater than or equal to x, e.g., x, y belongs to {1, 2}.

Further, a time interval between the PDCCH that schedules PDSCH/AP-CSI-RS (i.e., first element) and the PDSCH is less than the first predetermined threshold.

Further, a bandwidth part (BWP) where the PDCCH is located includes one CORESET group. For example, the CORESET in one BWP is not configured with CORESETPoolIndex at all, the default CORESETPoolIndex is 0, or all CORESET in one BWP has the same CORESETPoolIndex value.

Further, in the TCI state mapping table corresponding to the PDSCH, the maximum value for the number of the TCI state corresponding to one codepoint is z, where z is a positive integer greater than or equal to 1. The TCI state mapping table corresponding to the PDSCH includes a TCI state mapping table corresponding to BWP/serving cell/serving cell list where the PDSCH is located, or a TCI state mapping table corresponding to the CORESET group where the PDCCH that schedules the PDSCH is located. In some embodiments, when the PDCCH that schedules the PDSCH and the PDSCH are in the same serving cell, z value is greater than 1. However, when they are in different serving cells, z value is greater than or equal to 1.

Further, when the second codepoint refers to the lowest codepoint of the codepoint corresponding to z TCI states in the above TCI state mapping table corresponding to the PDSCH, where y is equal to the maximum value of the number of TCI state corresponding to one codepoint in the TCI mapping table, i.e., y is equal to Z.

Further, the above method for determining TCI state is applicable to both the situation where the PDCCH and the PDSCH are in the same serving cell (also known as carrier), and the situation where the PDCCH and the PDSCH are in different serving cells.

In an embodiment, one TCI state mapping table is configured for one BWP/serving cell/serving cell list/CORESET group via Media Access Control Control Element (MAC CE) as shown in Table 1. The TCI state mapping table also may be known as TCI state mapping relationship, i.e., a corresponding relation between a codepoint value in the TCI indicator domain of Downlink Control Information (DCI) and TCI state. The TCI indicator domain in the DCI is used for representing TCI state information of the PDSCH. When the time interval between the PDCCH and the PDSCH is less than a predetermined threshold, the TCI state of the PDSCH belongs to the TCI state {TCI state 3, TCI state 5} corresponding to the codepoint value of 001 (i.e., the second codepoint, the lowest codepoint of the codepoint {001,101,111} corresponding to two TCI states in Table 1). However, the number x of TCI state of the PDSCH is acquired based on the codepoint (i.e., first codepoint) indicated by the TCI indicator domain of the PDCCH that schedules the PDSCH. For instance, if the codepoint indicated by the TCI indicator domain of the PDCCH that schedules the PDSCH is 000, x=1; if the codepoint indicated by the TCI indicator domain of the PDCCH that schedules the PDSCH is 101, x=2.

TABLE 1

TCI state mapping table

| Codepoint | TCI state |
|---|---|
| 000 | TCI state 1 |
| 001 | TCI state 3, TCI state 5 |
| 010 | TCI state 3 |
| 011 | TCI state 5 |
| 100 | TCI state 4 |
| 101 | TCI state 1, TCI state 16 |
| 110 | TCI state 28 |
| 111 | TCI state 2, TCI state 8 |

When x is less than y, it should be confirmed which x TCI states of the y TCI states corresponding to the second codepoint serve as the basis for determining the TCI state of the PDSCH. One or more of the following approaches may be used for the determination:

Approach I: x TCI states of the PDSCH are acquired according to the first x out of the y TCI states. For example, when x=1 and y=2, the x TCI states of the PDSCH are acquired always based on the first TCI state, i.e., based on the first TCI state in {TCI state3, TCI state5}: TCI state3, e.g., TCI state3 serves as the TCI state of the PDSCH, or, the acquisition parameter of the TCI state of the PDSCH includes TCI state3.

Approach II: x TCI states are selected from y TCI states based on the TCI state corresponding to the first codepoint. For example, the TCI state is determined according to an intersection between the TCI state corresponding to the first codepoint and the TCI state corresponding to the second codepoint. If the first codepoint indicates 010, the TCI state of the PDSCH is TCI state3. If the first codepoint shows 011, the TCI state of the PDSCH is TCI state5. In other words, when the TCI state corresponding to the first codepoint belongs to the TCI state corresponding to the second codepoint, the TCI state of the PDSCH is acquired based on the TCI state corresponding to the first codepoint. Furthermore, it may be defined that an intersection between the TCI state corresponding to the first codepoint and the TCI state corresponding to the second codepoint is non-empty, and the number of TCI state included in the intersection may be defined as x.

Alternatively, in accordance with an intersection between the quasi-co-location reference signal set associating with the spatial receiving parameter in the TCI state corresponding to the first codepoint and the quasi-co-location reference signal set associating with the spatial receiving parameter in the TCI state corresponding to the second codepoint, x TCI states are determined from y TCI states as TCI state of the PDSCH having a scheduling interval less than the first predetermined threshold. For instance, when the first codepoint indicates 100, it corresponds to TCI state4. The quasi-co-location reference signal set corresponding to respective TCI state is illustrated in Table 2. In this case, the quasi-co-location reference signal associating with the spatial receiving parameter of the TCI state4 is SSB3, while in the TCI state3 and the TCI state5, only the quasi-co-location reference signal associating with the spatial receiving parameter of the TCI state3 is SSB3. Therefore, the TCI state of the PDSCH having a scheduling interval less than the first predetermined threshold is TCI state3.

TABLE 2

| TCI state index | (associated quasi-co-location parameter, quasi-co-location reference) | |
|---|---|---|
| TCI state4 | (QCL-Type A, CSI-RS1) | {Doppler shift, Doppler, spread, average delay, delay spread} |
| | (QCL-Type D, SSB3) | {Spatial Rx parameter} |
| TCI state3 | (QCL-Type A, CSI-RS3) | {Doppler shift, Doppler, spread, average delay, delay spread} |
| | (QCL-Type D, SSB3) | {Spatial Rx parameter} |
| TCI state5 | (QCL-Type A, CSI-RS6) | {Doppler shift, Doppler, spread, average delay, delay spread} |
| | (QCL-Type D, SSB16) | {Spatial Rx parameter) |

Alternatively, in case there is no intersection, the determination is made based on the TCI state in the y TCI states closest to the TCI state index corresponding to the first codepoint. For example, if the first codepoint is 000, the TCI state of the PDSCH is TCI state3 because the one in {TCI state3, TCI state5} closest to the TCI state index is TCI state3. When the first codepoint indicates 100, difference values between {TCI state3, TCI state5} corresponding to the second codepoint and the TCI state index corresponding to the first codepoint have the same absolute values, i.e., 1. Accordingly, the PDSCH is acquired according to the lowest TCI state, such as TCI state3.

Approach III: the number of TCI state of the PDSCH and the TCI state index are acquired based on the first codepoint on the condition that the TCI state corresponding to the first codepoint is defined to belong to the TCI state corresponding to the second codepoint. Alternatively, it is specified that the quasi-co-location reference signal set associating with the spatial receiving parameter in the TCI state corresponding to the first codepoint belongs to the quasi-co-location reference signal set associating with the spatial receiving parameter in the TCI state corresponding to the second codepoint as shown in Table 2. It is required that the quasi-co-location reference signal associating with the spatial receiving parameter of the TCI state indicated in the PDCCH corresponding to the PDSCH having a scheduling interval less than the first predetermined threshold belongs to {SSB3, SSB16}, or it is defined that the quasi-co-location reference signal associating with the spatial receiving parameter in the TCI state corresponding to the first codepoint and at least one quasi-co-location reference signal associating with the spatial receiving parameter in the TCI state corresponding to the second codepoint meet a quasi-co-location relation.

The above mapping table indicates mapping between the codepoint of the TCI indicator domain in the PDCCH and the TCI state. Embodiments of the present disclosure do not rule out the scenario when there is 1 codepoint as shown in Table 3.

TABLE 3

TCI State Mapping Table

| Codepoint | TCI state |
|---|---|
| 000 | TCI state1 |

In some embodiments of the present disclosure, acquiring the second information from the first information includes one of: the acquired parameters of the second information include the first information; the second information is the first information.

In some embodiments of the present disclosure, one quasi-co-location reference signal set corresponds to one TCI state, or one quasi-co-location reference signal set includes one or more quasi-co-location reference signals. An intersection of the channel large-scale parameter sets corresponding to different quasi-co-location reference is empty. When the quasi-co-location signal is described without TCI state, the TCI state in the above description of the present disclosure may be substituted as the quasi-co-location reference signal set.

In summary, the number of TCI state of PDSCH and the TCI state of PDSCH (i.e., TCI state index) are acquired via different signaling information or according to different codepoints respectively. The number of the PDSCH is acquired through the first codepoint and the TCI state index is acquired based on the second codepoint. The first codepoint is included in the PDCCH signaling that schedules the PDSCH and the second codepoint is a predetermined codepoint in the TCI mapping table. For example, the second codepoint is the lowest codepoint in the TCI state mapping table, i.e., codepoint 000; or the second codepoint is the lowest one of the codepoint corresponding to z TCI states in the TCI state mapping table.

The above TCI state of the PDSCH indicates that a quasi-co-location relation is satisfied between the Demodulation Reference Signal (DMRS) of the PDSCH and the reference signal in the TCI state, where the reference signal includes downlink synchronous signal.

Similarly, the number of quasi-co-location reference signal set of the PDSCH having a scheduling interval less than the first predetermined threshold is indicated by information contained in the PDCCH that schedules the PDSCH, such as TCI indicator domain indication. However, the quasi-co-location reference signal set of the PDSCH is acquired via a quasi-co-location reference signal of a second channel or a second signal. The second signal includes at least one of: a periodic CSI-RS, a semi-persistent CSI-RS, and a AP-CSI-RS having a scheduling interval greater than or equal to the second predetermined threshold. The second channel includes at least one of: a PDSCH having a scheduling interval greater than or equal to the first predetermined threshold, a semi-persistent PDSCH having a scheduling interval greater than or equal to the first predetermined threshold, and a CORESET. The scheduling interval of the semi-persistent PDSCH is calculated separately in each transmission opportunity. A time domain intersection between the second channel/second signal and the PDSCH having a scheduling interval less than the first predetermined threshold is non-empty. In some embodiments, the second channel/second signal and the PDSCH having a scheduling interval less than the first predetermined threshold are positioned in the same serving cell.

In an embodiment, FIG. 2 illustrates a schematic diagram of time domain resources occupied by the first element and the second element according to one embodiment. As shown in FIG. 2, DCI 1 schedules the PDSCH 1 and DCI 2 schedules the PDSCH 2. A time interval between the DCI 1 and the PDSCH 1 is less than a first predetermined value, and a time interval between the DCI 2 and the PDSCH 2 is greater than the first predetermined value. In case of an overlap between time domains of PDSCH 1 and PDSCH 2, the quasi-co-location reference signal set of the PDSCH 1 is acquired according to the quasi-co-location reference signal set of the PDSCH 2. However, there are 2 quasi-co-location reference signal sets for the PDSCH 2, and the number of quasi-co-location reference signal set for the PDSCH 1 is determined to be 1 or 2 via the information indicated in the DCI 1. When the number of quasi-co-location reference signal set of the PDSCH 1 is less than or equal to the number of quasi-co-location reference signal set for the PDSCH 2, the quasi-co-location reference signal set of the PDSCH 1 is determined from the two quasi-co-location reference signal sets of the PDSCH 2 by Approaches I to III described in the first example embodiment.

Alternatively, the quasi-co-location reference signal set of the PDSCH 1 is acquired via the TCI indicator domain in the DCI 1, but the quasi-co-location reference signal set indicated in the DCI 1 belongs to the quasi-co-location reference signal set of the PDSCH 2. Alternatively, a quasi-co-location relation is satisfied between the quasi-co-location reference signal set indicated in the DCI 1 and the quasi-co-location reference signal set of the PDSCH 2, or a quasi-co-location relation is satisfied between the quasi-co-location reference signal set associating with the spatial receiving parameter indicated in the DCI 1 and the quasi-co-location reference signal set associating with the spatial receiving parameter of the PDSCH 2.

The above second channel PDSCH includes PDSCH 2 only. It is certain that some embodiments of the present disclosure also include the situation where the second channel contains a plurality of PDSCHs. FIG. 3 illustrates a schematic diagram of time domain resources occupied by the first element and a plurality of second elements according to one embodiment. As shown in FIG. 3, the second channel includes PDSCH 2 and PDSCH 3, DCI 3 schedules the PDSCH 3, and a scheduling interval between the PDSCH2 and the PDSCH 3 is greater than the first predetermined threshold. When the second channel includes a plurality of channels, the TCI state of the PDSCH 1 is determined as follows: acquiring the quasi-co-location reference signal information of the PDSCH 1 based on the quasi-co-location reference signal set of the PDSCH sharing the same group information with the PDSCH 1. In some embodiments, the group information corresponding to the PDSCH 2 and the group information corresponding to the PDSCH 1 are identical. For example, if the CORESET group where the DCI 1 is located is the same as the CORESET group where the DCI 2 is located, the quasi-co-location reference signal set of the PDSCH 1 is acquired according to the quasi-co-location reference signal set of the PDSCH 2. The above group information may also be other group information. For instance, a piece of group information is assigned for each channel or signal, where the group information also may be receiving antenna group information. Another way for determining the TCI state of the PDSCH 1 includes: the quasi-co-location reference signal sets of the PDSCH 2 and the PDSCH 3 compose y quasi-co-location reference signal sets, and x quasi-co-location reference signal sets are determined from the y quasi-co-location reference signal sets by the above approach. Moreover, the sequence of the quasi-co-location reference signal sets of the PDSCH 2 and the PDSCH 3 among the y quasi-co-location reference signal sets is determined according to the group information.

Second Example Embodiment

In this embodiment, c TCI states (i.e., x in the aforementioned embodiment) of AP-CSI-RS are acquired via y TCI states corresponding to the second codepoint (i.e., predetermined codepoint) in the TCI state mapping table, where c is a positive integer less than or equal to y, and y is a positive integer greater than or equal to 1. The second codepoint is a codepoint in the TCI state mapping table that satisfies the predetermined feature. For example, the second codepoint is the lowest one of the codepoint that corresponds to the maximum number of TCI states in the TCI state mapping table, or the second codepoint represents codepoint00 in the TCI state mapping table.

Further, the TCI state mapping table refers to the TCI state mapping table of the PDSCH in the BWP/serving cell/serving cell list where the AP-CSI-RS is located. Alternatively, the TCI state mapping table is a TCI state mapping table corresponding to the PDSCH in the CORESET group where the PDCCH that schedules the AP-CSI-RS is located.

Further, a time interval between the PDCCH that schedules the AP-CSI-RS and the AP-CSI-RS is less than a second predetermined threshold.

Further, the BWP where the PDCCH is located includes one CORESET group. For example, the default CORESET-PoolIndex is 0, i.e., none of the CORESET in one BWP is configured with CORESETPoolIndex; or all CORESET in one BWP has the same CORESETPoolIndex value.

In the TCI state mapping table, the maximum value for the number of the TCI state corresponding to one codepoint is z, where z is a positive integer greater than or equal to 1. In some embodiments, when the PDCCH scheduling the AP-CSI-RS and the AP-CSI-RS are in the same serving cell, z value is greater than 1. However, when they are in different serving cells and the serving cell where the AP-CSI-RS is located is not configured with CORESET, z value is greater than or equal to 1. Alternatively, despite that the PDCCH and the AP-CSI-RS are in the same serving cell or different serving cells, z value is greater than or equal to 1 as long as the serving cell where the AP-CSI-RS is located excludes the CORESET. When the serving cell where the AP-CSI-RS is located contains the CORESET, z value is greater than 1.

Additionally, the above method for determining TCI state is applicable to both the situation where the PDCCH and the AP-CSI-RS are in the same serving cell (also known as carrier), and the situation where PDCCH and AP-CSI-RS are in different serving cells.

When c is less than or equal to y, c TCI states of the AP-CSI-RS are determined from y TCI states based on the signaling information and/or predetermined rules. The c TCI states may be determined by one or more of the following approaches.

Approach I: An index configured in the AP-CSI-RS resource indicates the TCI state among the y TCI states according to which the TCI state of AP-CSI-RS is acquired. For example, the index denotes relative index of the TCI state of AP-CSI-RS in the y TCI states.

Approach II: c TCI states are determined based on an intersection between the TCI state configured for the AP-CSI-RS resource by Radio Resource Control (RRC) or MAC-CE command and y TCI states, or among the y TCI states, the index difference value between the c TCI states and the TCI state index configured for the AP-CSI-RS by RRC or MAC-CE command has the minimum absolute value.

Approach III: the TCI state of AP-CSI-RS is acquired according to the TCI state index configured for the AP-CSI-RS by RRC or MAC-CE command Additionally, it is further defined that when a time interval between the PDCCH and the AP-CSI-RS is less than the second predetermined threshold, the TCI state index configured for the AP-CSI-RS by RRC or MAC-CE command belongs to y TCI states corresponding to the second codepoint.

Approach IV: the first c TCI states out of the y TCI states are TCI states of the AP-CSI-RS.

Moreover, the above time domain symbol where the AP-CSI-RS is located or the time domain symbol where the AP-CSI-RS is located according to the above method for determining TCI state contains no second channel or second signal. The second signal includes at least one of: a periodic CSI-RS, a semi-persistent CSI-RS, and a AP-CSI-RS having a scheduling interval greater than the second predetermined threshold. The second channel includes at least one of: a PDSCH having a scheduling interval greater than the first predetermined threshold, a semi-persistent PDSCH having a scheduling interval greater than the second predetermined threshold and a CORESET. The scheduling interval of the semi-persistent PDSCH is calculated separately in each transmission opportunity. Moreover, the second channel/second signal and the AP-CSI-RS are positioned in the same serving cell.

Similarly, when the time domain symbol where the AP-CSI-RS is located includes the second channel PDSCH, the quasi-co-location reference signal set of the AP-CSI-RS having a scheduling interval less than the second predetermined threshold is determined from y quasi-co-location reference signal sets corresponding to the second channel PDSCH by one or more of Approaches I to IV illustrated in the second example embodiment. FIG. 4 illustrates a further schematic diagram of time domain resources occupied by the first element and the second element according to one embodiment. As shown in FIG. 4, the DCI 1 schedules Channel State Information Reference Signal (CSI-RS) 1, DCI 2 schedules PDSCH 2. A time interval between the DCI 1 and the CSI-RS 1 is less than the first predetermined threshold, and a time interval between the DCI 2 and the PDSCH 2 is greater than the first predetermined threshold. In case of an overlap between the time domains of the CSI-RS 1 and the PDSCH 2, the quasi-co-location reference signal set of the CSI-RS 1 is acquired according to the quasi-co-location reference signal of the PDSCH 2. However, there are 2 quasi-co-location reference signal sets for the PDSCH 2, and the number of quasi-co-location reference signal set for the CSI-RS 1 is set to be 1. The quasi-co-location reference signal set for the CSI-RS 1 may be determined from the two quasi-co-location reference signal sets of the PDSCH 2 through one or more of the above Approaches I to IV.

Alternatively, the quasi-co-location reference signal set of the CSI-RS 1 is acquired via the information indicated in the DCI 1, while the quasi-co-location reference signal set indicated in the DCI 1 belongs to the quasi-co-location reference signal set of the PDSCH 2. Alternatively, a quasi-co-location relation is satisfied between the quasi-co-location reference signal set indicated in the DCI 1 and the quasi-co-location reference signal set of the PDSCH 2, or a quasi-co-location relation is satisfied between the quasi-co-location reference signal set associating with the spatial receiving parameter indicated in the DCI 1 and the quasi-co-location reference signal set associating with the spatial receiving parameter of the PDSCH 2. The above acquiring the quasi-co-location reference signal set of the CSI-RS 1 via the information indicated in the DCI 1 includes that one value of a CSI request domain in the DCI 1 corresponds to one or more CSI-RS resources sets of the high-layer configuration. The high layer signaling configures the quasi-co-location reference signal set for every CSI-RS resource in each CSI-RS resource set. As such, the above predetermined conditions should be taken into account when the high layer signaling configures the quasi-co-location reference signal set for the CSI-RS 1 having a scheduling interval less than the second predetermined threshold.

Third Example Embodiment

In this embodiment, the number x of the quasi-co-location reference signal sets (or TCI states) of the PDSCH/CSI-RS is determined based on the signaling information or the predetermined rule via the following approaches. The following description takes the number of TCI state as an example. The number of the quasi-co-location reference signal sets may also be determined in the following way: for example, when the base station fails to configure TCI state for the PDSCH/AP-CSI-RS, the quasi-co-location reference signal sets of the PDSCH/AP-CSI-RS may also be acquired by the approaches below.

Approach I: x is determined according to the maximum number of TCI states corresponding to one codepoint in the TCI state mapping table.

Approach II: x is determined based on the number of CORESET groups. When the number of CORESET group is equal to 1, x is determined to be less than or equal to 2, or x is less than or equal to the maximum value for the number of TCI state corresponding to one codepoint in the TCI state mapping table. When the number of CORESET group is greater than 1, x is determined to be 1.

Approach III: x is determined according to the number of the TCI state mapping table corresponding to one BWP. When the number of the TCI state mapping table is 1, x is determined as 2 or the maximum number of TCI state corresponding to one codepoint in the TCI state mapping table is determined to be y. When the number of the TCI state mapping table is greater than 1, x is determined to be 1.

Approach IV: x is acquired based on the number of TCI states in the codepoint indicated by the TCI domain of the PDCCH that schedules the PDSCH.

Approach V: the number of TCI states is determined according to the scheduling interval of the PDSCH. When the scheduling interval of the PDSCH is less than the first predetermined threshold, the number of TCI state for the PDSCH is set to 2.

Approach VI: x is determined based on the number of CORESET groups and the maximum number z of TCI states corresponding to one codepoint in the TCI state mapping table. In an embodiment, when the number of CORESET group is equal to 2, x is equal to 1. When the number of CORESET group is equal to 1 and z value is equal to 1, x equals to 1. When the number of CORESET group is equal to 1 and z value is greater than 1, x equals to 2.

Approach VII: x is determined based on the number of CORESET groups, the maximum number z of TCI states corresponding to one codepoint in the TCI state mapping table and the information indicated in the PDCCH that schedules the PDSCH/AP-CSI-RS. In an embodiment, when the number of CORESET group is equal to 2, x is equal to 1. When the number of CORESET group is equal to 1 and z value is equal to 1, x equals to 1. When the number of CORESET group is equal to 1 and z value is greater than 1, x is determined based on the information indicated in the PDCCH that schedules the PDSCH/AP-CSI-RS.

Further, the above scheduling interval of PDSCH/AP-CSI-RS is less than the first predetermined threshold, or the PDCCH that schedules PDSCH/AP-CSI-RS does not include the information indicated by the TCI state and the above scheduling interval of the PDSCH is greater than or equal to the first predetermined threshold.

Further, the PDSCH is repeatedly transmitted in the time domain. Besides, for some of the multiple time domain repetition transmission occasions of the PDSCH, a time interval between their starting time domain symbol and the PDCCH that schedules the PDSCH is less than the first predetermined threshold. For some repetition transmission occasions, a time interval between their starting time domain symbol and the PDCCH that schedules the PDSCH is greater than or equal to the first predetermined threshold. In such case, x may be further acquired according to the number of TCI states indicated in the PDCCH by at least one of the above Approaches I to VII. Furthermore, the number x of the TCI states of the PDSCH/AP-CSI-RS stated above indicates the number of TCI states of the PDSCH over one time domain symbol. The total number of TCI states corresponding to the PDSCH over different time domain resources is greater than or equal to x. Alternatively, the number x of TCI state of the PDSCH is the total number of TCI state corresponding to the PDSCH, including TCI states corresponding to the PDSCH over different time domain resources.

Further, the communication node may determine the transmission mode of the PDSCH based on the x value. The transmission mode represents a mapping relationship between x TCI states and d resources. The resources include at least one of: a frequency domain resource group, a time domain resource group and a DMRS port group. In an embodiment, the following method is utilized, including the following:

When x=1 and the high layer signaling informs the base station of a transmission mode of one of "FDMSchemeA", "FDMSchemeB" and "TDMSchemeA", the terminal uses this particular TCI state over all frequency domain resources occupied by the PDSCH and in every time domain transmission opportunity, and the PDSCH of the terminal has only one repetition transmission opportunity.

When x=2 and the high layer transmission mode is one of "FDMSchemeA" and "PDMSchemeB", different frequency domain resources of the PDSCH correspond to different TCI states of the x TCI states as shown in FIG. 5.

Figure 6:
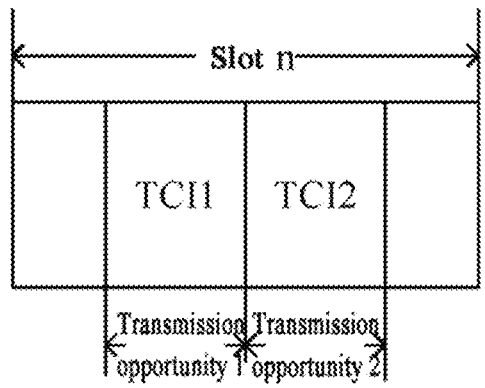
FIG. 6 illustrates a schematic diagram in which two repetition transmissions occur in one slot and different transmissions correspond to different TCI states according to an embodiment of the present disclosure.

When x=2 and the high layer informs the transmission mode of "TDMSchemeA", different TCI states of the x TCI states correspond to different repetition transmission occasions of one timeslot (slot) as shown in FIG. 6.

When x=1, at least one time domain parameter in the time domain parameter list of the high-layer configuration includes a number of repetition transmission between slots, and the time domain parameter indicated by the PDCCH that schedules the PDSCH include the number of inter-slot repetition transmission, the PDSCH is repeatedly transmitted between different slots and the same TCI state is used between slots of repetition transmission.

Figure 7:
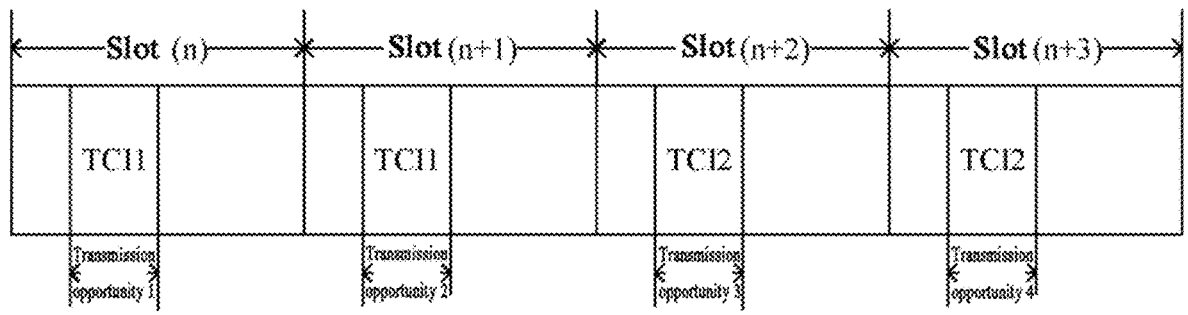
FIG. 7 illustrates a schematic diagram showing four inter-slot repetition transmissions and a mapping relationship between the four repetition transmission occasions and two TCI states according to an embodiment of the present disclosure.
Figure 8:
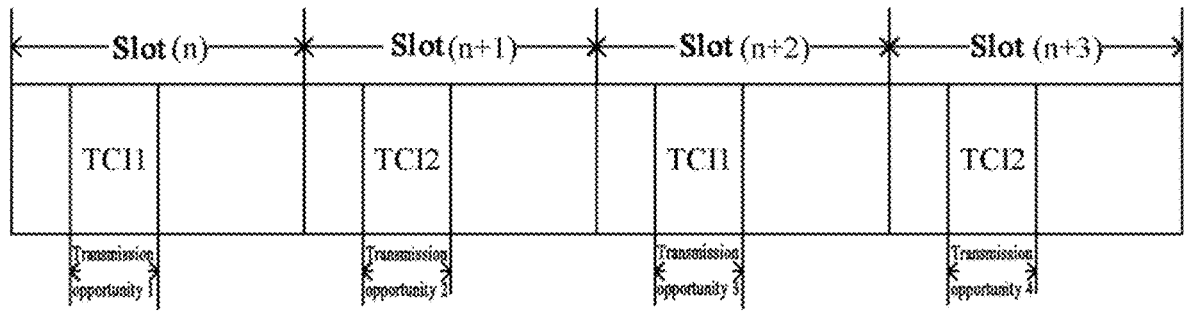
FIG. 8 illustrates a further schematic diagram showing four inter-slot repetition transmissions and a mapping relationship between the four repetition transmission occasions and two TCI states according to an embodiment of the present disclosure.

When x=2, at least one time domain parameter in the time domain parameter list of the high layer configuration includes the number of the inter-slot repetition transmission, and the time domain parameter indicated by the PDCCH that schedules the PDSCH include the number of the inter-slot repetition transmission, the TCI state changes once every 2 repetition transmission occasions as shown in FIG. 7. Alternatively, the TCI state changes once for every repetition transmission opportunity as shown in FIG. 8.

When x=1 and the time domain parameter indicated by the PDCCH that schedules the PDSCH exclude the number of the inter-slot repetition transmission, the DMRS port in all Code Division Multiplexing (CDM) groups of the PDSCH correspond to the same TCI state.

Figures 9, 10, 11, 12:
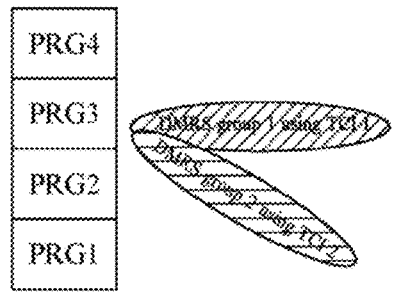
FIG. 9 illustrates a schematic diagram in which DMRS ports in different CDM groups of the PDSCH respectively correspond to different TCI states of the x TCI states according to an embodiment of the present disclosure.
FIG. 10 illustrates a schematic diagram in which eight inter-slot repetition transmission occasions correspond to two default TCI states, and the two default TCI states change once every two of the eight repetition transmission occasions according to an embodiment of the present disclosure.
FIG. 11 illustrates a schematic diagram in which eight inter-slot repetition transmission occasions correspond to two default TCI states, and the two default TCI states change once every one of the eight repetition transmission occasions according to an embodiment of the present disclosure.
FIG. 12 illustrates a schematic diagram in which eight inter-slot repetition transmission occasions are divided into first transmission opportunity set and second transmission opportunity set, and transmission occasions in different transmission opportunity set respectively correspond to different numbers and/or determination modes of different TCI states according to an embodiment of the present disclosure.

When x=2 and the time domain parameter indicated by the PDCCH that schedules the PDSCH exclude the number of the inter-slot repetition transmission, the DMRS port in different CDM groups of the PDSCH corresponds to different TCI states in the x TCI states as shown in FIG. 9.

Further, the x TCI states may be acquired according to the above approaches described by the first example embodiment or the second example embodiment, or the approaches elaborated in third example embodiment.

Figure 13:
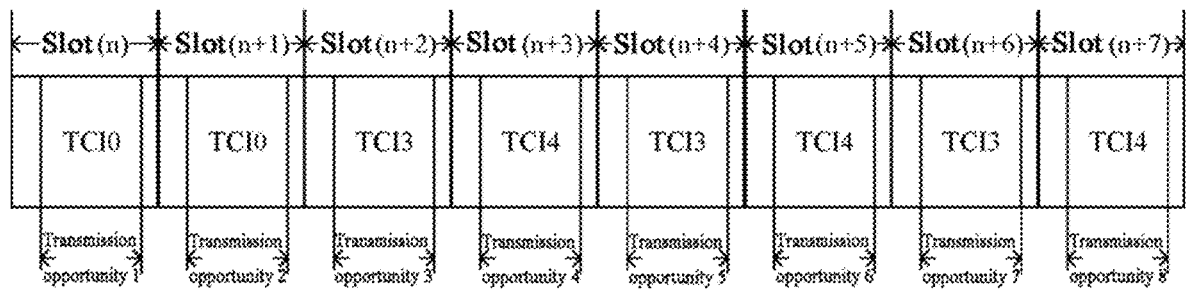
FIG. 13 illustrates a further schematic diagram in which eight inter-slot repetition transmission occasions are divided into first transmission opportunity set and second transmission opportunity set, and transmission occasions in different transmission opportunity set respectively correspond to different numbers and/or determination modes of different TCI states according to an embodiment of the present disclosure.

Further, PDSCH is repeatedly transmitted in the time domain. Besides, for some of the multiple time domain repetition transmission occasions of the PDSCH, a time interval between their starting time domain symbol and the PDCCH that schedules the PDSCH is less than the first predetermined threshold. For some repetition transmission occasions, a time interval between their starting time domain symbol and the PDCCH that schedules the PDSCH is greater than or equal to the first predetermined threshold. In such case, x may be further acquired according to the number of TCI state indicated in the PDCCH by at least one of the above Approaches I to VII. That is, the x TCI states acquired via the above approaches correspond to all time domain repetition transmission occasions of the PDSCH. For example, in case there are 8 time domain repetition transmission occasions for the PDSCH, the scheduling interval in the first two time domain repetition transmission occasions is less than the first predetermined threshold, while the subsequent six time domain repetition transmission occasions have a scheduling interval greater than the first predetermined threshold as shown in FIGS. 10 to 11. For example, the number of TCI state is 2 by default, which is the case for the TCI state of the lowest codepoint among the codepoint corresponding to two TCI states in the TCI state mapping table. When x is determined to be 2, for example, the two TCI states are {TCI state0, TCI state1}, the two TCI states change once every two of the eight repetition transmission occasions according to FIG. 10. Alternatively, the two TCI states change once every one of the eight repetition transmission occasions according to FIG. 11. Alternatively, the x acquired according to the above Approaches I to VII by now is only applicable to the transmission occasions having a scheduling interval less than the first predetermined threshold, and the transmission mode for the above transmission occasions is determined in view of the x value. The x value corresponding to the transmission occasions having a scheduling interval greater than or equal to the second predetermined threshold is acquired according to the TCI state indicated by the TCI domain in the PDCCH that schedules the PDSCH, and the transmission mode for these transmission occasions is determined in view of the x value. In an embodiment, the PDSCH contains 8 transmission occasions over the time domain, respectively in different slots. The transmission opportunity in the first two slots has a scheduling interval less than the first predetermined threshold. If it is determined from at least one of the Approaches I to VII that x=1, the transmission opportunity in the first two slots use this TCI state, e.g., the TCI state obtained in any of the first to third example embodiments. The transmission opportunity in the subsequent six slots has a scheduling interval greater than or equal to the first predetermined threshold, and PDCCH indicates two TCI states. As such, the TCI state of the transmission opportunity in the subsequent six slots is acquired based on the two TCI states indicated in the PDCCH. When the scheduling interval is less than the first predetermined threshold, TCI 0 is acquired by the approaches described in the first to third example embodiments as the TCI state of the PDSCH. The TCI state indicated in the PDCCH that schedules the PDSCH is {TCI 3, TCI 4}. FIG. 12 illustrates that the TCI state changes once every two of the six transmission occasions, while FIG. 13 shows that the TCI state changes once every one of the six transmission occasions. According to FIGS. 12 to 13, the x corresponding to the transmission occasions 1 to 2 having a scheduling interval less than the first predetermined threshold is 1 and the TCI state is indicated by TCI 0. The x corresponding to the transmission occasions 3 to 8 having a scheduling interval greater than or equal to the first predetermined threshold is 2 and the TCI state is {TCI 3, TCI 4} denoted in the PDCCH that schedules the PDSCH. In the embodiments of the present disclosure, one quasi-co-location reference signal set includes one or more reference signals, and each reference signal is associated with one quasi-co-location parameter respectively as shown in Table 4. One TCI state corresponds to one quasi-co-location reference signal set {CSI-RS1, SSB3}, where the large-scale parameters associated with the CSI-RS1 include {Doppler shift, Doppler spread, average delay, delay spread}. The SSB3 is associated with a spatial receiving parameter. For example, if the base station configures TCI state n as the TCI state of the DMRS 1, the DSMR 1 and the CSI-RS1 satisfy a quasi-co-location relation with respect to {Doppler shift, Doppler spread, average delay, delay spread}. the DSMR 3 and the SSB3 satisfy a quasi-co-location relation with respect to the spatial receiving parameter.

TABLE 4

| TCI state index | (associated quasi-co-location reference, quasi-co-location reference) | |
| --- | --- | --- |
| TCI state n | (QCL-Type A, CSI-RS1) | {Doppler shift, Doppler spread, average delay, delay spread} |
| | (QCL-Type D, SSB3) | {Spatial Rx parameter} |

Fourth Example Embodiment

In this embodiment, the quasi-co-location reference signal set of the PDSCH/AP-CSI-RS is determined according to the signaling information and/or predetermined rule, wherein the determination of the quasi-co-location reference signal set includes at least three approaches:

Approach I: acquiring, in the serving cell where the PDSCH/AP-CSI-RS is located, the quasi-co-location reference signal set of the PDSCH/AP-CSI-RS based on a quasi-co-location reference signal of CORESET having the lowest CORESET-ID among the CORESETs associating with a detected search space within a slot closest to the PDSCH/AP-CSI-RS.

Approach II: acquiring the quasi-co-location reference signal set of the PDSCH/AP-CSI-RS based on a quasi-co-location reference signal of CORESET having the lowest CORESET-ID in a time unit closest to the PDSCH/AP-CSI-RS among time units containing CORESET with predetermined features. The CORESET with predetermined features includes: the CORESET is in the serving cell where the PDSCH/AP-CSI-RS is located. The CORESET group to which the CORESET belongs includes a CORESET where the downlink control channel that schedules the PDSCH/AP-CSI-RS is located, the CORESET associating a detected search space in the time unit;

Approach III: acquiring the TCI state of the PDSCH/AP-CSI-RS based on the TCI state corresponding to the predetermined codepoint in the TCI state mapping table corresponding to the PDSCH/AP-CSI-RS. For example, the predetermined codepoint includes one of: the lowest one of codepoint corresponding to z TCI states, the lowest codepoint 0, and the lowest codepoint among the codepoint containing the predetermined TCI state, where z is the maximum number of the TCI state corresponding to one codepoint in the TCI mapping table.

Further, the above PDSCH meets at least one of: the PDSCH has a scheduling interval less than the first predetermined threshold, and the PDCCH that schedules the PDSCH excludes the TCI indication information of the PDSCH.

Further, the scheduling interval of the AP-CSI-RS is less than the second predetermined threshold.

Further, the method for acquiring the quasi-co-location reference signal set of the PDSCH/AP-CSI-RS is determined according to the first information, wherein the first information includes at least one of: the number of CORESET groups, the maximum number z corresponding to one codepoint in the TCI state mapping table corresponding to the PDSCH/AP-CSI-RS, the number of set of values for the same type of parameter of the PDSCH, whether the PDCCH that schedules the AP-CSI-RS and the PDCCH are located in the same component carrier (CC), and whether the frequency bandwidth where the AP-CSI-RS is located is configured with CORESET.

In an embodiment, when the BWP where the PDCCH that schedules the PDSCH/AP-CSI-RS is located contains only one CORESET group and z is equal to 1, the quasi-co-location reference signal set of the PDSCH/AP-CSI-RS is determined according to Approach I. When the BWP where the PDCCH that schedules the PDSCH/AP-CSI-RS is located contains only one CORESET group and z is equal to 2, the quasi-co-location reference signal set of the PDSCH/AP-CSI-RS is determined according to Approach III. When the BWP where the PDCCH that schedules the PDSCH/AP-CSI-RS is located contains two CORESET groups, the quasi-co-location reference signal set of the PDSCH/AP-CSI-RS is determined according to Approach II.

If the PDCCH that schedules the AP-CSI-RS and the AP-CSI-RS are located in different CC, it is determined to use the above Approach III or one of the {Approach I, Approach II, Approach III} in accordance with whether the serving cell/BWP where the AP-CSI-RS is located is configured with CORESET. In case where no the CORESET is configured, Approach III is utilized; otherwise, one of the {Approach I, Approach II, Approach III} is adopted. For example, when the BWP where the PDCCH that schedules the AP-CSI-RS is located contains only one CORESET group and z is equal to 1, the quasi-co-location reference signal set of the AP-CSI-RS is determined according to Approach I. When the BWP where the PDCCH that schedules the AP-CSI-RS is located contains only one CORESET group and z is equal to 2, the quasi-co-location reference signal set of the AP-CSI-RS is determined according to Approach III. When the BWP where the PDCCH that schedules the AP-CSI-RS is located contains two CORESET groups, the quasi-co-location reference signal set of the AP-CSI-RS is determined according to Approach II.

Alternatively, it is firstly determined to use the above Approach III or one of the {Approach I, Approach II, Approach III} in accordance with whether the serving cell/BWP where the AP-CSI-RS is located is configured with CORESET. If the CORESET is not configured, Approach III is utilized; otherwise, one of the {Approach I, Approach II, Approach III} is adopted. For example, when the BWP where the PDCCH that schedules the AP-CSI-RS is located contains only one CORESET group and z is equal to 1, the quasi-co-location reference signal set of the AP-CSI-RS is determined according to Approach I. When the BWP where the PDCCH that schedules the AP-CSI-RS is located contains only one CORESET group and z is equal to 2, the quasi-co-location reference signal set of the AP-CSI-RS is determined according to Approach III. When the BWP where the PDCCH that schedules the AP-CSI-RS is located contains two CORESET groups, the quasi-co-location reference signal set of the AP-CSI-RS is determined according to Approach II.

In some embodiments of the present disclosure, the serving cell is CC, or the serving cell includes carrier components corresponding to different subcarrier intervals within the serving cell.

The number of CORESET group in the above first information also may be substituted with the number of set of values for the same type of parameter of the PDSCH in the BWP where the PDSCH/AP-CSI-RS is located. The same type of parameter includes at least one of: a scrambling sequence of PDSCH and the number of sets for rate matching information of the PDSCH. The PDSCH scheduled by different CORESET groups is acquired using different values of the same type of parameter. One set of values may consist of one or more values.

Further, the above time domain symbol where the AP-CSI-RS is located contains no second channel or signal, or the time domain symbol where the AP-CSI-RS is located according to one of the above three approaches for determining the quasi-co-location reference signal contains no second channel or second signal. The second signal includes at least one of: a periodic CSI-RS, a semi-persistent CSI-RS, and an AP-CSI-RS having a scheduling interval greater than the second predetermined threshold. The second channel includes at least one of: a PDSCH having a scheduling interval greater than the first predetermined threshold, a semi-persistent PDSCH having a scheduling interval greater than the first predetermined threshold, and a CORESET. The scheduling interval of the semi-persistent PDSCH is calculated separately in each transmission opportunity. Moreover, the second channel/second signal and the AP-CSI-RS are positioned in the same serving cell.

Fifth Example Embodiment

In this embodiment, when the PDCCH that schedules the PDSCH and the PDSCH are in different CC and a time interval therebetween is less than the first predetermined threshold, the TCI state of the PDSCH is acquired based on the TCI state corresponding to the predetermined codepoint in the TCI state mapping table corresponding to the PDSCH. The predetermined codepoint includes at least one of: lowest codepoint 0, the lowest codepoint in the codepoint corresponding to z TCI states, the lowest codepoint in the codepoint corresponding to d TCI states, and the lowest codepoint of the codepoint corresponding to the maximum number of quasi-co-location reference signal set in the TCI state mapping table, the corresponding quasi-co-location reference signal set including a quasi-co-location reference signal of a predetermined CORESET. Where z indicates the maximum number of TCI states corresponding to one codepoint in the TCI state mapping table corresponding to the PDSCH, and d denotes the minimum number of TCI states corresponding to one codepoint in the TCI state mapping table corresponding to the PDSCH.

The TCI state mapping table corresponding to the PDSCH includes at least one of: the TCI state mapping table corresponding to the PDSCH in the BWP/serving cell/serving cell list where the PDSCH is located, and the TCI state mapping table corresponding to the CORESET group where the PDCCH that schedules the PDSCH is located. The TCI state of the PDSCH scheduled by the CORESET group is one item of the TCI state mapping table.

Sixth Example Embodiment

In this embodiment, the TCI state of the AP-CSI-RS is acquired according to c TCI states out of the TCI states corresponding to the predetermined codepoint in the TCI state mapping table. The codepoint includes one of: the lowest codepoint 0, the lowest codepoint in the codepoint corresponding to z TCI states, the lowest codepoint in the codepoint corresponding to d TCI states, and the lowest codepoint of the codepoint corresponding to the maximum number of quasi-co-location reference signal set in the TCI state mapping table, the corresponding quasi-co-location reference signal set including a quasi-co-location reference signal of a predetermined CORESET. Where z indicates the maximum number of TCI states corresponding to one codepoint in the TCI state mapping table corresponding to the PDSCH, and d denotes the minimum number of TCI states corresponding to one codepoint in the TCI state mapping table corresponding to the PDSCH. Moreover, according to the signaling information or the predetermined rule, it is determined which one of the three codepoints represents the predetermined codepoint.

In some embodiments, the PDCCH that schedules the AP-CSI-RS and the AP-CSI-RS are in different CC and a time interval therebetween is less than the first predetermined threshold.

In some embodiments, the time domain symbol where the AP-CSI-RS is located contains the second channel or signal, and the AP-CSI-RS is received using the quasi-co-location parameter of the second channel or signal over the time domain symbol where the AP-CSI-RS is located.

In some embodiments, the BWP/serving cell where the AP-CSI-RS is located is configured without CORESET, or the BWP/serving cell where the AP-CSI-RS is located is configured with one CORESET group and z value is greater than 1.

In some embodiments, the TCI state configured for the AP-CSI-RS by the high-layer signaling includes a quasi-co-location reference signal associating with the spatial receiving parameter.

The TCI state mapping table corresponding to the AP-CSI-RS includes one of: the TCI state mapping table corresponding to the PDSCH of the BWP/serving cell/serving cell list where the AP-CSI-RS is located, and the TCI state mapping table corresponding to the CORESET group where the PDCCH that schedules the AP-CSI-RS is located. The TCI state of the PDSCH scheduled by the CORESET group is one item of the TCI state mapping table.

In the embodiment of the present disclosure, the high layer signaling may include signaling in addition to DCI, such as one of RRC and MAC-CE.

Seventh Example Embodiment

In this embodiment, the quasi-co-location reference signal set of the AP-CSI-RS is acquired based on a quasi-co-location reference signal of a CORESET having the lowest CORESET-ID in a time unit closest to the AP-CSI-RS among time units containing the CORESET with a predetermined feature. The CORESET with the predetermined feature includes: the CORESER is positioned in the serving cell where the AP-CSI-RS is located, the CORESET group to which the CORESET belongs consists of a CORESET where the PDCCH that schedules the AP-CSI-RS is located.

In some embodiments, a time interval between the PDCCH that schedules the AP-CSI-RS and the AP-CSI-RS is less than the first predetermined threshold.

In some embodiments, the time domain symbol where the AP-CSI-RS is located contains the second channel or signal, and the AP-CSI-RS is received using the quasi-co-location parameter of the second channel or signal over the time domain symbol where the AP-CSI-RS is located.

In some embodiments, the BWP/serving cell where the AP-CSI-RS is located is configured with CORESET group.

In some embodiments, the TCI state configured for the AP-CSI-RS by the high-layer signaling includes a quasi-co-location reference signal associating with the spatial receiving parameter.

The TCI state mapping table corresponding to the AP-CSI-RS includes one of: the TCI state mapping table corresponding to the PDSCH of the BWP/serving cell/serving cell list where the AP-CSI-RS is located, and the TCI state mapping table corresponding to the CORESET group where the PDCCH that schedules the AP-CSI-RS is located. The TCI state of the PDSCH scheduled by the CORESET group is one item of the TCI state mapping table.

In the embodiment of the present disclosure, the high layer signaling may include signaling in addition to DCI, such as one of RRC and MAC-CE.

Eighth Example Embodiment

In this embodiment, when the PDCCH that schedules the PDSCH and the PDSCH are in different CC, the PDCCH that schedules the PDSCH excludes the TCI indication information and a time interval therebetween is less than the first predetermined threshold, then the TCI state of the PDSCH is acquired based on the TCI state corresponding to the predetermined codepoint in the TCI state mapping table corresponding to the PDSCH. The predetermined codepoint includes at least one of: the lowest codepoint 0, the lowest codepoint in the codepoint corresponding to z TCI states, the lowest codepoint in the codepoint corresponding to d TCI states, and the lowest codepoint of the codepoint corresponding to the maximum number of quasi-co-location reference signal set in the TCI state mapping table, the corresponding quasi-co-location reference signal set including a quasi-co-location reference signal of a predetermined CORESET. Where z indicates the maximum number of TCI states corresponding to one codepoint in the TCI state mapping table corresponding to the PDSCH, and d denotes the minimum number of TCI states corresponding to one codepoint in the TCI state mapping table corresponding to the PDSCH.

In some embodiments, the predetermined codepoint is determined according to the signaling information or the predetermined rule. For example, the predetermined is determined based on at least one of: the number of CDM groups where the DMRS of the PDSCH is located, and the repetition transmission mode of the PDSCH. For example, in case there is one CDM in which the DMRS of the PDSCH is located, the lowest codepoint in the codepoint corresponding to d TCI states is the predetermined codepoint.

Ninth Example Embodiment

In this embodiment, when the PDCCH that schedules the PDSCH excludes the TCI indication information, the PDSCH corresponds to one quasi-co-location reference signal set or one TCI state.

In some embodiments, a time interval between the PDCCH that schedules the PDSCH and the PDSCH is greater than or equal to the first predetermined threshold.

In some embodiments, when the PDCCH that schedules the PDSCH and the PDSCH belong to different CC, the PDSCH corresponds to at most two quasi-co-location reference signal sets or two TCI states. If the PDCCH that schedules the PDSCH and the PDSCH belong to the same CC, the PDSCH corresponds to up to one quasi-co-location reference signal set or one TCI state.

Tenth Example Embodiment

In this embodiment, when the PDCCH that schedules the PDSCH and the PDSCH are in different CC, the third information is determined based on the signaling information and/or predetermined rule. The third information includes at least one of: whether the PDCCH that schedules the PDSCH contains the TCI indication information, and whether a time interval between the PDCCH that schedules the PDSCH and the PDSCH is less than the first predetermined threshold.

For UE of Release 15 (Rel-15), the PDCCH that schedules the PDSCH needs to contain the TCI indication information, and a time interval between the PDCCH that schedules the PDSCH and the PDSCH is required to be greater than or equal to the first predetermined threshold, i.e., not less than the first predetermined threshold. For UE of Release 16 (Rel-16), the PDCCH that schedules the PDSCH may include or exclude the TCI indication information, and a time interval between the PDCCH that schedules the PDSCH and the PDSCH is not restricted, i.e., the time interval may be greater than or equal to the first predetermined threshold, or less than the first predetermined threshold. Alternatively, the third information may be further determined for the users of Rel-16 based on the signaling information.

In the above first to tenth example embodiments, the TCI state list of the RRC configuration corresponding to the BWP/serving cell/serving cell list where the PDSCH/AP-CSI-RS is located includes at least one TCI state, the one TCI state containing a quasi-co-location reference signal associating with QCL-TypeD (i.e., spatial receiving parameter). Alternatively, a quasi-co-location reference signal is associated with QCL-TypeD (i.e., spatial receiving parameter) in the TCI state configured for the AP-CSI-RS by RRC/MAC-CE.

Eleventh Example Embodiment

In the TCI state mapping table, when the number of TCI state corresponding to one codepoint is greater than 1, at least one of the following information may be indicated via the signaling information: whether the multiple TCI states correspond to the same Phase Tracking Reference Signal (PTRS) port, and whether a frequency domain position of the PTRS port corresponding to each TCI state is obtained according to the frequency domain resource group corresponding to each TCI state, when the multiple TCI states correspond to a plurality of frequency domain resource groups.

Furthermore, the signaling information includes MAC-CE signaling that activates the TCI state mapping table.

Twelfth Example Embodiment

In this embodiment, the number of TCI states of the DMRS of the PDSCH is determined based on the number of CDM groups in which the DMRS included in the PDSCH is located.

In an embodiment, if the number of CDM group is 1, there is one TCI state. If the number of CDM group is greater than 1, there is more than one TCI state, such as 2.

Thirteenth Example Embodiment

In this embodiment, it is determined whether the TCI state set activated for one frequency bandwidth by the MAC-CE satisfies the predetermined conditions. In view of the determination result, it is determined whether a time interval between the PDCCH and the APS-CSI-RS/PDSCH is considered for acquiring the quasi-co-location reference signal of the APS-CSI-RS/PDSCH. The PDCCH schedules APS-CSI-RS/PDSCH and the TCI state set activated for one frequency bandwidth by the MAC-CE includes a TCI state activated for the PDSCH in one frequency bandwidth by the MAC-CE, i.e., the TCI states in the above TCI state mapping state constitute a set. One frequency bandwidth includes one of: serving cell, component carrier, BWP and a set of a segment of continuous Physical Resource Blocks (PRB).

Moreover, the predetermined conditions include that the TCI state set includes at least one TCI state, and the TCI state contains a quasi-co-location reference signal associating with the spatial receiving parameter.

When the activated TCI state set satisfies the predetermined conditions, the time interval between the PDCCH that schedules the APS-CSI-RS and the APS-CSI-RS is considered for acquiring the quasi-co-location reference signal of the APS-CSI-RS. If the time interval is less than the second predetermined threshold, the quasi-co-location reference signal of the APS-CSI-RS is acquired using the first approach. In case that the time interval is greater than or equal to the second predetermined threshold, the quasi-co-location reference signal of the APS-CSI-RS is acquired based on the information indicated in the PDCCH that schedules the APS-CSI-RS. The first approach includes: when the time domain symbol where the APS-CSI-RS is located contains the second channel or signal, the quasi-co-location reference signal of the APS-CSI-RS is acquired based on the quasi-co-location reference signal of the second channel or signal; otherwise, the quasi-co-location reference signal of the APS-CSI-RS is acquired according to the third information.

If the activated TCI state set fails to meet the predetermined conditions, the time interval between the PDCCH that schedules the APS-CSI-RS and the APS-CSI-RS is not taken into account for acquiring the quasi-co-location reference signal of the APS-CSI-RS. Regardless of the time interval, the quasi-co-location reference signal of the APS-CSI-RS is always required based on the information indicated in the PDCCH that schedules the APS-CSI-RS.

If the activated TCI state set satisfies the predetermined conditions, the time interval between the PDCCH that schedules the PDSCH and the PDSCH is taken into account for acquiring the quasi-co-location reference signal of the PDSCH. When the time interval is less than the first predetermined threshold, the quasi-co-location reference signal of the PDSCH is acquired using the fourth information. In case that the time interval is greater than or equal to the first predetermined threshold, the quasi-co-location reference signal of the PDSCH is acquired by the third approach. The third approach includes: when the PDCCH that schedules the PDSCH includes the indication information of the TCI state of the PDSCH, the quasi-co-location reference signal of the PDSCH is acquired based on the quasi-co-location reference signal included in the TCI state of the PDSCH indicated in the PDCCH that schedules the PDSCH. When the PDCCH that schedules the PDSCH excludes the indication information of the TCI state of the PDSCH, the quasi-co-location reference signal of the PDSCH is acquired according to the quasi-co-location reference signal of the PDCCH that schedules the PDSCH.

If the activated TCI state set fails to satisfy the predetermined conditions, the time interval between the PDCCH that schedules the PDSCH and the PDSCH is not taken into account for acquiring the quasi-co-location reference signal of the PDSCH. Regardless of the time interval, the quasi-co-location reference signal of the PDSCH is always required based on the information indicated in the PDCCH that schedules the PDSCH, or the quasi-co-location reference signal of the PDSCH is acquired according to the above third approach.

The above third information or fourth information is acquired using one of Information A to Information C:

Information A: acquiring, in the serving cell where the PDSCH/AP-CSI-RS is located, the quasi-co-location reference signal set of the PDSCH/AP-CSI-RS based on a quasi-co-location reference signal of CORESET having the lowest CORESET-ID among the CORESETs associating with a detected search space within a slot closest to the PDSCH/AP-CSI-RS;

Information B: acquiring the quasi-co-location reference signal set of the PDSCH/AP-CSI-RS based on a quasi-co-location reference signal of CORESET having the lowest CORESET-ID in a time unit closest to the PDSCH/AP-CSI-RS among time units containing CORESET with a predetermined feature. The CORESET with the predetermined feature includes: the CORESET in the serving cell where the PDSCH/AP-CSI-RS is located, the CORESET in the CORESET group that includes a CORESET where the downlink control channel that schedules the PDSCH/AP-CSI-RS is located, and the CORESET associating a detected search space in the time unit;

Information C: acquiring the TCI state of the PDSCH/AP-CSI-RS based on the TCI state corresponding to the predetermined codepoint in the TCI state mapping table corresponding to the PDSCH/AP-CSI-RS. For example, the predetermined codepoint includes one of: the lowest one of codepoint corresponding to z TCI states, the lowest codepoint 0, the lowest codepoint among the codepoint containing the predetermined TCI state. Where z is the maximum number of the TCI state corresponding to one codepoint in the TCI mapping table.

Moreover, when a plurality of TCI state mapping tables is activated in one frequency bandwidth, it is determined whether the TCI state set activated for one frequency bandwidth by the MAC-CE satisfies the predetermined conditions. the TCI state set activated for one frequency bandwidth by the MAC-CE includes one of:

Set 1: a TCI state set including activated TCI states in all of the plurality of TCI state mapping tables;

Set 2: the activated TCI states in each of the plurality of TCI state mapping tables form one TCI state set respectively. It is separately determined whether each TCI state set meets the predetermined conditions. In view of the determination result, it is determined whether the scheduling time interval of the PDSCH/AP-CSI-RS is considered for acquiring the quasi-co-location reference signal of the PDSCH/AP-CSI-RS associating with this TCI state set. For example, if the plurality of TCI state mapping tables respectively corresponds to one CORESET group, it is determined separately whether the activated TCI state in the TCI state mapping table corresponding to each CORESET group satisfies the predetermined conditions. For instance, when it is determined that the activated TCI state set 1 in the TCI state mapping table 1 corresponding to the CORESET group 1 satisfies the predetermined conditions, the scheduling time interval of the PDSCH/AP-CSI-RS is considered for acquiring the quasi-co-location reference signal of the PDSCH/AP-CSI-RS scheduled by the CORESET group 1. When the activated TCI state set 2 in the TCI state mapping table 2 corresponding to the CORESET group 2 fails to satisfy the predetermined conditions, the scheduling time interval of the PDSCH/AP-CSI-RS is not considered for acquiring the quasi-co-location reference signal of the PDSCH/AP-CSI-RS scheduled by the CORESET group 2.

Figure 14:
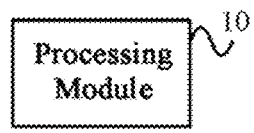
FIG. 14 illustrates a structure diagram of a quasi-co-location information acquisition apparatus according to an embodiment of the present disclosure.

FIG. 14 illustrates a structure diagram of a quasi-co-location information acquisition apparatus according to one embodiment. The quasi-co-location information acquisition apparatus may be configured in a communication node as show in FIG. 14, including a processing module 10.

The processing module 10 is configured to acquire, based on first information, a number x and/or a determination mode of quasi-co-location reference signal sets of a first element.

The first information includes at least one of: information indicated in a downlink control channel that schedules the first element; the number of quasi-co-location reference signal sets corresponding to a predetermined codepoint in a transmission configuration indicator (TCI) state mapping table; the number of CORESET groups; the maximum number of quasi-co-location reference signal sets corresponding to one codepoint in the TCI state mapping table; a number of time domain repetition of the first element; and the number of quasi-co-location reference signal sets corresponding to a second element.

A time interval between the downlink control channel that schedules the first element and the first element is less than a predetermined threshold; the first element includes at least one of channel and signal. A time domain intersection between the second element and the first element is non-empty. The second element includes at least one of an element having a scheduling interval greater than the predetermined threshold, a periodic element, a semi-persistent element, a CORESET, a channel and signal. Where x is a positive integer greater than or equal to 1.

The quasi-co-location acquisition apparatus proposed by this embodiment can fulfill the method of obtaining quasi-co-location information according to the above embodiments. The quasi-co-location acquisition apparatus proposed by this embodiment have similar working principles and achieve similar technical effects with the above embodiments, so the working principles and the technical effects will not be repeated here.

In an embodiment, in the case that the processing module 10 obtains the number x of quasi-co-location reference signal set of the first reference element based on the first information, x quasi-co-location reference signal sets of the first element belong to a first set, the first set including any one of following sets: a set composed of y quasi-co-location reference signal sets corresponding to the predetermined codepoint; and a set composed of y quasi-co-location reference signal sets corresponding to the second element.

y is a positive integer greater than or equal to 1, or y is a positive integer greater than or equal to x.

In an embodiment, x quasi-co-location reference signal sets of the first element include any one of the following: first x quasi-co-location reference signal sets of the y quasi-co-location reference signal sets; an intersection between the y quasi-co-location reference signal sets and a quasi-co-location reference signal set indicated in the downlink control channel that schedules the first element; and a quasi-co-location reference signal set in the y quasi-co-location reference signal sets meeting a predetermined feature, wherein a quasi-co-location relation is met between a quasi-co-location reference signal associating with a spatial receiving parameter in the quasi-co-location reference signal set meeting the predetermined feature and a first quasi-co-location reference signal, the first quasi-co-location reference signal being a quasi-co-location reference signal associating with spatial receiving parameter in a quasi-co-location reference signal set indicated for the first element in the downlink control channel that schedules the first element.

In an embodiment, when the first set includes y quasi-co-location reference signal sets corresponding to the predetermined codepoint, the first element meets at least one of: the downlink control channel that schedules the first element is located in a different frequency bandwidth from the first element; and the maximum number of quasi-co-location reference signal set corresponding to one codepoint in the TCI state mapping table is greater than 1.

In an embodiment, the processing module 10 acquires the number x of quasi-co-location reference signal set of the first reference element based on the number of CORESET group, including: x is equal to 1 when the number of CORESET group is greater than 1; x is less than or equal to the maximum number of quasi-co-location reference signal set corresponding to one codepoint in the TCI state mapping table when the number of the CORESET group is equal to 1.

In an embodiment, the processing module 10 acquires, based on a number of time domain repetition of the first element, the number x and/or a determination mode of quasi-co-location reference signal sets of the first element, including at least one of: acquiring a value of the x for a first transmission opportunity set and a second transmission opportunity set respectively; determining the same value of the x corresponding to the first transmission opportunity set and the second transmission opportunity set; determining different determination modes of the quasi-co-location signal set for the first transmission opportunity set and the second transmission opportunity set; determining the same determination mode of the quasi-co-location signal set for the first transmission opportunity set and the second transmission opportunity set; corresponding a quasi-co-location reference signal set for the first transmission opportunity set and the second transmission opportunity set respectively; and determining the same quasi-co-location reference signal set corresponding to the first transmission opportunity set and the second transmission opportunity set.

A number of time domain repetition of the first element is greater than 1, and a domain repetition transmission opportunity includes the first transmission opportunity set and the second transmission opportunity set. A time interval between a starting time domain symbol of each transmission opportunity in the first transmission opportunity set and the downlink control channel that schedules the first element is less than the predetermined threshold. A time interval between a starting time domain symbol of each transmission opportunity in the second transmission opportunity set and the downlink control channel that schedules the first element is greater than or equal to the predetermined threshold.

In an embodiment, in case of a determination mode in which the processing module 10 acquires, based on first information, a quasi-co-location reference signal set of the first element, the first information also includes at least one of: whether a CORESET is configured in a frequency bandwidth where the first element is located; and whether the downlink control channel that schedules the first element is located in a different frequency bandwidth from the first element.

In an embodiment, a determination mode for a quasi-co-location reference signal set of the first element includes at least one of: acquiring, in a frequency bandwidth where the first element is located, a quasi-co-location reference signal set of the first element based on a quasi-co-location reference signal of a CORESET having the lowest CORESET-ID among CORESETs associating with a detected search space within a slot closest to the first element; acquiring the quasi-co-location reference signal set of the first element based on a quasi-co-location reference signal of a CORESET having the lowest CORESET-ID in a time unit closest to the first element among time units containing CORESET with a predetermined feature. The CORESET with the predetermined feature includes: the CORESET in a frequency bandwidth where the first element is located, the CORESET in a CORESET group that includes a CORESET where the downlink control channel that schedules the PDSCH/AP-CSI-RS is located, and the CORESET associating with a detected search space in the time unit; and acquiring the quasi-co-location reference signal set of the first element based on a quasi-co-location reference signal set corresponding to the predetermined codepoint in the TCI state mapping table, wherein the TCI state mapping table is a TCI state mapping table in a frequency bandwidth where the first element is located, or the TCI state mapping table is a TCI state mapping table corresponding to a CORESET group where a downlink control channel that schedules the first element is located.

In an embodiment, in the case that a downlink control channel that schedules the first element is in a different frequency bandwidth from the first element, if a frequency bandwidth where the first element is located is configured without CORESET, the processing module 10 determines that the x quasi-co-location reference signal sets of the first element belong to a quasi-co-location reference signal set corresponding to a predetermined codepoint in the TCI state mapping table; if a frequency bandwidth where the first element is located is configured with CORESET, the processing module 10 determines, based on the first information, x quasi-co-location reference signal sets of the first element.

In an embodiment, the processing module 10 determining, based on the first information, the x quasi-co-location reference signal sets of the first element includes at least one of the following methods including the following: determining the x quasi-co-location reference signal sets based on the maximum number z of quasi-co-location reference signal sets corresponding to one codepoint in the TCI state mapping table and/or the number d of CORESET groups in the frequency bandwidth where the first element is located; when d is equal to 1 and z is equal to 1, determining the x quasi-co-location reference signal sets based on a quasi-co-location reference signal set of a CORESET meeting a first predetermined feature; when d is equal to 1 and z is greater than 1, determining the x quasi-co-location reference signal sets based on one or more quasi-co-location reference sets in a quasi-co-location reference signal set corresponding to the predetermined codepoint in the TCI state mapping table; when d is greater than 1, determining the x quasi-co-location reference signal sets based on a quasi-co-location reference signal set of CORESET meeting a second predetermined feature.

The CORESET having the first predetermined feature includes CORESET having lowest CORESET index in a CORESET group associated with a detected search space in a time unit closest to the first element, the CORESET being located in the same frequency bandwidth with the first element.

The CORESET having the second predetermined feature includes CORESET having lowest CORESET index in a CORESET associated with a detected search space and belonging to a predetermined CORESET group in a time unit closest to the first element, the CORESET being located in the same frequency bandwidth with the first element.

In one embodiment, the first element meets at least one of the following: the downlink control channel that schedules the first element is located in a frequency bandwidth different from a downlink control channel of the first element; when the first element includes a measurement reference signal, a time domain symbol where the first element is located excludes the second element; when the first element includes a measurement reference signal, configuration information of the first element includes quasi-co-location reference signals associating with a spatial receiving parameter; a list of quasi-co-location reference signal set configured in a frequency bandwidth where the first element is located at least includes a quasi-co-location reference signal set that includes a quasi-co-location reference signal associating with a spatial receiving parameter; a list of quasi-co-location reference signal set activated in a frequency bandwidth where the first element is located at least includes a quasi-co-location reference signal set that includes a quasi-co-location reference signal associating with a spatial receiving parameter; a list of quasi-co-location reference signal set correspondingly activated by a predetermined CORESET group in a frequency bandwidth where the first element is located at least includes a quasi-co-location reference signal set that includes a quasi-co-location reference signal associating with a spatial receiving parameter; a list of quasi-co-location reference signal set of a PDSCH activated in a frequency bandwidth where the first element is located at least includes a quasi-co-location reference signal set that includes a quasi-co-location reference signal associating with a spatial receiving parameter; and a list of quasi-co-location reference signal set of PDSCH correspondingly activated by a predetermined CORESET group in a frequency bandwidth where the first element is located at least includes a quasi-co-location reference signal set that includes a quasi-co-location reference signal associating with a spatial receiving parameter.

In an embodiment, the TCI state mapping table meets at least one of the following: TCI state mapping table corresponding to a frequency bandwidth where the first element is located; TCI state mapping table corresponding to a CORESET group where a downlink control channel that schedules the first element is located; and a TCI state set including TCI states included in the TCI state mapping table includes at least one TCI state containing quasi-co-location reference signals associating with a spatial receiving parameter.

In an embodiment, the processing module 10 is also configured to determine x quasi-co-location reference signal sets of the first element based on any one of following determinations: determining whether a TCI state set included in a TCI state mapping table corresponding to a frequency bandwidth where the first element is located includes one TCI state, the one TCI state containing quasi-co-location reference signals associating with a spatial receiving parameter; if no, acquiring the x quasi-co-location reference signal sets of the first element are acquired based on x quasi-co-location reference signal sets indicated in a downlink control channel that schedules the first element; and if yes, x quasi-co-location reference signal sets of the first element could not be acquired based on x quasi-co-location reference signal sets indicated in a downlink control channel that schedules the first element; or x quasi-co-location reference signal sets indicated in a downlink control channel that schedules the first element belong to a predetermined set.

In an embodiment, the processing module 10 acquiring, based on information indicated in a downlink control channel that schedules the first element, the number x of quasi-co-location reference signal set of the first element includes at least one of: when the first element is a channel, the processing module 10 determines the number x of quasi-co-location reference signal set of the first element based on a transmission configuration indication TCI indicator domain in a downlink control channel of the first element; and when the first element represents a measurement reference signal, the processing module 10 determines the number x of quasi-co-location reference signal set of the first element based on a first codepoint indicated in a TCI indicator domain obtained from a request domain in a downlink control channel of the first element.

In an embodiment, the predetermined codepoint includes any one of following codepoint: the lowest codepoint in a codepoint which corresponds to the maximum number of quasi-co-location reference signal sets in the TCI state mapping table; the lowest codepoint in a codepoint which corresponds to the minimum number of quasi-co-location reference signal sets in the TCI state mapping table; the lowest codepoint in a codepoint which corresponds to the maximum number of quasi-co-location reference signal sets in the TCI state mapping table, corresponding quasi-co-location reference signal sets including a quasi-co-location reference signal set of predetermined CORESET; codepoint 0; the predetermined codepoint and a codepoint indicated by a TCI indicator domain in the downlink control channel that schedules the first element are two independent codepoints; and the predetermined codepoint is not acquired according to a TCI indicator domain in a downlink control channel that schedules the first element.

In an embodiment, the processing module 10 is also configured to determine a transmission mode of the first element based on x, wherein the transmission mode includes a mapping relationship between x quasi-co-location reference signal sets of the first element and parameters of the first element, where parameters of the first element include at least one of: a frequency domain resources, a time domain resources, a Demodulation Reference Signal (DMRS) ports, and a repetition transmission opportunity.

In an embodiment, the CORESET group meets at least one of: a CORESET of the CORESET group is located in a frequency bandwidth where the first element is located; the CORESET group includes a CORESET where a downlink control channel that schedules the first element is located; CORESET of the CORESET group is located in a frequency bandwidth that schedules the first element; the number of CORESER group is the number of CORESER group in a frequency bandwidth where the first element is located; and the number of CORESER group is the number of CORESER group in a frequency bandwidth where a downlink control channel that schedules the first element is located.

Embodiments of the present disclosure also provide a communication node, including: a processor configured to, when executing a computer program, implement the method according to any embodiment of the present disclosure.

Embodiments below provide a structure diagram when the communication node is a base station by way of examples.

Figure 15:
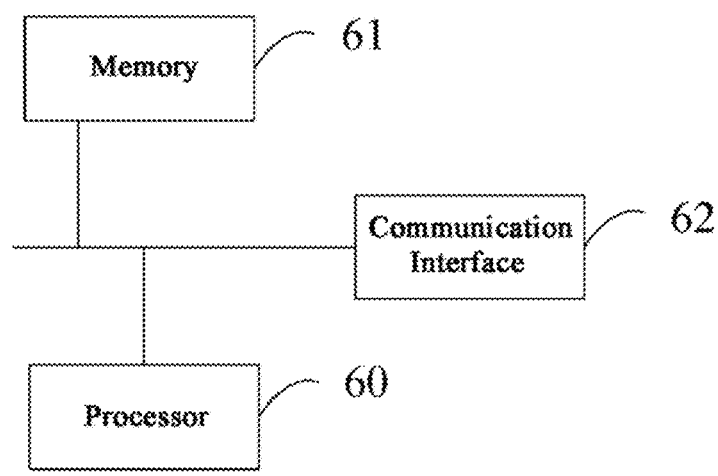
FIG. 15 illustrates a structure diagram of a base station according to an embodiment of the present disclosure.

FIG. 15 illustrates a structure diagram of a base station according to one embodiment. As shown, the base station includes a processor 60, a memory 61 and a communication interface 62. The base station may include one or more processors 60. FIG. 15 takes one processor 60 as the example. The processor 60, memory 61 and communication interface 62 in the base station may be connected via buses or in other ways. In FIG. 5, the connection is illustrated by an example of bus. Bus here indicates one or more types of bus structures, including memory bus, or memory controller, peripheral bus, accelerated graphic port, processor or local bus utilizing any of a plurality of bus structures.

The memory 61, as a computer-readable storage medium, may be configured as a storage software program and a computer executable program and module, e.g., program instruction/module corresponding to the method according to the embodiments of the present disclosure. By running software programs, instructions and modules stored in the memory 1, the processor executes at least one functional application of the base station and processes the data, i.e., implementing the above method for acquiring the quasi-co-location information.

The memory 61 may include a program storage area and a data storage area, where the program storage area may store operating systems and application programs required by at least one function; and the data storage area may store data created from the use of the terminal etc. In addition, the memory 61 may include a high random access memory, as well as a non-volatile memory, e.g., at least one magnetic disc storage component, flash component, or other non-volatile solid state storage components. In some embodiments, the memory 61 may include a memory disposed remote to the processor 60, and the remote memory may be connected to the base station via networks. Instances of the above networks include, but not limited to, Internet, Intranet, network, mobile communication network and combinations thereof.

The communication interface 62 may be configured to receive and transmit data.

Embodiments of the present disclosure also provide a computer readable storage medium stored thereon with a computer program, wherein the computer program, when executed by a processor, implements the method according to any embodiments of the present disclosure.

The computer storage medium according to the embodiments of the present disclosure may be any combinations of one or more computer readable media. The computer readable medium may be computer readable signal medium or computer readable storage medium. The computer readable storage medium, for example, includes but not limited to, electric, magnetic, optical, electromagnetic, infrared, or semiconductor systems, apparatus or devices, or any combinations thereof. The computer readable storage medium includes (in non-exhaustive way): electrical connections having one or more conductive wires, portable computer disc, hard disc, random-access memory (RAM), read-only memory (ROM), erasable programmable read-only memory (EPROM), flash, optic fiber, portable compact disc read-only memory (CD-ROM), optical storage devices, magnetic storage devices, or any combinations thereof. In the present disclosure, the computer readable storage medium may be any physical medium containing a storage program, wherein the program may be used by or in combination with instruction executing system, apparatus or device.

The computer readable signal medium may include data signals in a baseband or propagated as a part of the carrier. Data signals carry the computer readable program codes. The propagated data signals may be provided in various forms, including but not limited to, electromagnetic signals, optical signals or any suitable combinations thereof. The computer readable signal medium also may be any computer readable media in addition to the computer readable storage medium. The computer readable media may send, propagate or transmit programs that are used by or in combination with instruction executing system, apparatus or device.

The program codes contained on the computer readable media may be transmitted via any suitable media, including but not limited to, radio, electrical wires, optical cables, radio frequency (RF) and the like, or any suitable combinations thereof.

Computer program codes for executing the operations of the present disclosure may be programmed using one or more programming languages or a combination of various programming languages. In addition to object-oriented programming languages, such as Java, Smalltalk, C++, Ruby and Go, the programming languages also include conventional procedural programming languages, e.g., "C" language and the like. The program codes may be executed completely on a user computer, or partially on a user computer, or as a separate software packet, or partially on a user computer and partially on a remote computer, or completely on a remote computer or server. When a remote computer is involved, the remote computer may be connected to the user computer via any types of networks, including Local Area Network (LAN) or Wide Area Network (WAN), or to an external computer (for example via Internet connections using Internet service providers).

Those skilled in the art should understand that the term "user terminal" encompasses any suitable types of wireless user devices, such as mobile phones, portable data processing apparatuses, portable web browsers or vehicle-mounted mobile stations.

In general, various embodiments of the present disclosure may be implemented in hardware or dedicated circuits, software, logic or any combinations thereof. For example, some aspects of the present disclosure may be implemented in the hardware while other aspects may be fulfilled in firmware or software executed by controller, microprocessor or other computing apparatuses. The present disclosure is not restricted in this regard.

Embodiments of the present disclosure may be implemented by allowing a data processor of a mobile apparatus to execute the computer programs, e.g., in a physical entity of the processor, or via hardware or a combination of software and hardware. The computer program instructions may be assembly instructions, Instruction Set Architecture (ISA) instructions, machine instructions, machine-related instructions, microcodes, firmware instructions, state setting data, or source codes or target codes programmed by any combinations of one or more programming languages.

Block diagrams of any logic flows in the drawings may represent program steps, or interconnected logic circuits, modules and functions, or combinations of program steps and logic circuits, modules and functions. The computer program may be stored on the memory. The memory may be of any types suitable for the local technical environment and may be implemented using any suitable data storage technologies, including but not limited to, Read-only Memory (ROM), Random Access Memory (RAM), optical storage apparatus and system ((Digital Video Disc, DVD) or CD disc) etc. The computer readable medium may include non-transient storage medium. The data processor may be of any types suitable for the local technical environment, including but not limited to, general-purpose computer, dedicated computer, microprocessor, Digital Signal Processor (DSP), Applicant Specific Integrated Circuit (ASIC), Field-Programmable Gate Array (FPGA) and processors based on multi-core processing architecture.

We claim:

1. A method of obtaining quasi-co-location information, comprising:
    acquiring, based on y quasi-co-location reference signal sets, x quasi-co-location reference signal sets of a first element, the first element comprising a physical downlink shared channel (PDSCH) or aperiodic channel state information reference signal (AP-CSI-RS);
    wherein the y quasi-co-location reference signal sets comprise one of:
        y quasi-co-location reference signal sets corresponding to a predetermined codepoint in a transmission configuration indicator (TCI) state mapping table, wherein the predetermined codepoint comprises the lowest codepoint among codepoints which corresponds to the maximum number of quasi-co-location reference signal sets in the TCI state mapping table; or
        y quasi-co-location reference signal sets corresponding to a second element;
    wherein a time interval between a downlink control channel that schedules the first element and the first element is less than a predetermined threshold; a time domain intersection between the second element and the first element is non-empty; the second element comprises at least one of an element having a scheduling interval greater than the predetermined threshold, a periodic element, a semi-persistent element and a control resource set (CORESET); the second element comprises at least one of channel and signal; and x is a positive integer greater than or equal to 1, and y is a positive integer greater than 1; and wherein a quasi-co-location reference set comprises one or more quasi-co-location reference signals configured in a TCI state.

2. The method of claim 1, wherein the x quasi-co-location reference signal sets of the first element comprise:

first x quasi-co-location reference signal sets of the y quasi-co-location reference signal sets.

3. The method of claim 1, wherein:

in a case where the second element is present on a time domain symbol where the first element is located, acquiring the x quasi-co-location reference signal sets based on the y quasi-co-location reference signal sets corresponding to the second element;

in a case where the second element is not present on a time domain symbol where the first element is located, acquiring the x quasi-co-location reference signal sets based on the y quasi-co-location reference signal sets corresponding to the predetermined item codepoint.

4. The method of claim 1, wherein, in a case where the first element comprises the PDSCH:

determining a mapping relationship between the x quasi-co-location reference signal sets and d resources of the first element, wherein a resource of the d resources comprise at least one of: a frequency domain resource group, a time domain resource group or a demodulation reference signal (DMRS) port group, d being a positive integer greater than 1.

5. The method of claim 4, wherein:

in a case where x=2 and a high layer informs a transmission mode of "TDMSchemeA", different repetition transmission occasions of one slot correspond to different quasi-co-location reference signal sets of the x quasi-co-location reference signal sets.

6. The method of claim 4, wherein:

in a case where x=2 and at least one time domain parameter in a time domain parameter list configured by a high layer comprises a number of inter-slot repetition transmission occasions and a time domain parameter indicated by the control channel that schedules the first element comprises a number of inter-slot repetition transmission occasions, different quasi-co-location reference signal sets of the x quasi-co-location reference signal sets correspond to different occasion groups of d repetition transmission occasions of the first element and the x quasi-co-location reference signal sets change once every two repetition transmission occasions of the d repetition transmission occasions of the first element, or different quasi-co-location reference signal sets of the x quasi-co-location reference signal sets correspond to different occasion groups of d repetition transmission occasions of the first element and the x quasi-co-location reference signal sets change once every one repetition transmission occasions of the d repetition occasions of the first element, wherein d is a positive integer greater than 1.

7. The method of claim 1, wherein the TCI state mapping table meets at least one of:

the TCI state mapping table corresponding to a frequency bandwidth where the first element is located;

the TCI state mapping table corresponding to a CORESET group where the downlink control channel that schedules the first element is located; or a TCI state set consisting of TCI states comprised in the TCI state mapping table comprises at least one TCI state comprising a quasi-co-location reference signal associating with a spatial receiving parameter.

8. The method of claim 1, in a case where the time interval between the downlink control channel that schedules the first element and the first element is less than the predetermined threshold and the first element comprising a plurality of transmission occasions, wherein the time interval is a time interval between the downlink control channel that schedules the first element and a first transmission occasion of the first element.

9. The method of claim 1, further comprising:

in a case where the downlink control channel that schedules the PDSCH and the PDSCH are in different CCs, a third information is determined based on signaling information, the third information comprising at least one of: whether the downlink control channel that schedules the PDSCH comprising TCI indication information, or whether a time interval between the downlink control channel that schedules the PDSCH and the PDSCH is less than a first predetermined threshold.

10. The method of claim 1, further comprising:

acquiring, by a communication node based on first information, at least one of the x and a determination mode of a quasi-co-location reference signal set of the first element;

wherein the first information comprises at least one of:
information indicated in a downlink control channel that schedules the first element;
a number of quasi-co-location reference signal sets corresponding to the predetermined codepoint in the transmission configuration indicator (TCI) state mapping table;
a number of control resource set (CORESET) group;
the maximum number of quasi-co-location reference signal sets corresponding to one codepoint in the TCI state mapping table; or
a number of quasi-co-location reference signal sets corresponding to the second element.

11. A non-transient computer-readable storage medium, having a computer program stored thereon, wherein the computer program, when executed by a processor, performs:

acquiring, based on y quasi-co-location reference signal sets, x quasi-co-location reference signal sets of a first element, the first element comprising a physical downlink shared channel (PDSCH) or aperiodic channel state information reference signal (AP-CSI-RS);

wherein the y quasi-co-location reference signal sets comprise one of:

y quasi-co-location reference signal sets corresponding to a predetermined codepoint in a transmission configuration indicator (TCI) state mapping table, wherein the predetermined codepoint comprises the lowest codepoint among codepoints which corresponds to the maximum number of quasi-co-location reference signal sets in the TCI state mapping table; or y quasi-co-location reference signal sets corresponding to a second element;

wherein a time interval between a downlink control channel that schedules the first element and the first element is less than a predetermined threshold; a time domain intersection between the second element and the first element is non-empty; the second element comprises at least one of an element having a scheduling interval greater than the predetermined threshold, a periodic element, a semi-persistent element and a control resource set (CORESET); the second element comprises at least one of channel and signal; and x is a positive integer greater than or equal to 1, and y is a positive integer greater than 1; and wherein a quasi-co-location reference set comprises one or more quasi-co-location reference signals configured in a TCI state.

12. A communication node, comprising a processor, when executing a computer program, configured to:

acquire, based on y quasi-co-location reference signal sets, x quasi-co-location reference signal sets of a first element, the first element comprising a physical downlink shared channel (PDSCH) or aperiodic channel state information reference signal (AP-CSI-RS);

wherein the y quasi-co-location reference signal sets comprise one of:

y quasi-co-location reference signal sets corresponding to a predetermined codepoint in a transmission configuration indicator (TCI) state mapping table, wherein the predetermined codepoint comprises the lowest codepoint among codepoints which corresponds to the maximum number of quasi-co-location reference signal sets in the TCI state mapping table; or y quasi-co-location reference signal sets corresponding to a second element;

wherein a time interval between a downlink control channel that schedules the first element and the first element is less than a predetermined threshold; a time domain intersection between the second element and the first element is non-empty; the second element comprises at least one of an element having a scheduling interval greater than the predetermined threshold, a periodic element, a semi-persistent element and a control resource set (CORESET); the second element comprises at least one of channel and signal; and x is a positive integer greater than or equal to 1, and y is a positive integer greater than 1; and wherein a quasi-co-location reference set comprises one or more quasi-co-location reference signals configured in a TCI state.

13. The communication node of claim 12, wherein the x quasi-co-location reference signal sets of the first element comprise:

first x quasi-co-location reference signal sets of the y quasi-co-location reference signal sets.

14. The communication node of claim 12, wherein:

in a case where the second element is present on a time domain symbol where the first element is located, the processor is configured to acquire the x quasi-co-location reference signal sets based on the y quasi-co-location reference signal sets corresponding to the second element;

in a case where the second element is not present on a time domain symbol where the first element is located, the processor is configured to acquire the x quasi-co-location reference signal sets based on the y quasi-co-location reference signal sets corresponding to the predetermined item codepoint.

15. The communication node of claim 12, wherein, in a case where the first element comprises the PDSCH, the processor is configured to:

determine a mapping relationship between the x quasi-co-location reference signal sets and d resources of the first element, wherein a resource of the d resources comprise at least one of: a frequency domain resource group, a time domain resource group or a demodulation reference signal (DMRS) port group, d being a positive integer greater than 1.

16. The communication node of claim 15, wherein:

in a case where x=2 and a high layer informs a transmission mode of "TDMSchemeA", different repetition transmission occasions of one slot correspond to different quasi-co-location reference signal sets of the x quasi-co-location reference signal sets.

17. The communication node of claim 15, wherein:

in a case where x=2 and at least one time domain parameter in a time domain parameter list configured by a high layer comprises a number of inter-slot repetition transmission occasions and a time domain parameter indicated by the control channel that schedules the first element comprises a number of inter-slot repetition transmission occasions, different quasi-co-location reference signal sets of the x quasi-co-location reference signal sets correspond to different occasion groups of d repetition transmission occasions of the first element and the x quasi-co-location reference signal sets change once every two repetition transmission occasions of d repetition transmission occasions of the first element, or different quasi-co-location reference signal sets of the x quasi-co-location reference signal sets correspond to different occasion groups of d repetition transmission occasions of the first element and the x quasi-co-location reference signal sets change once every one repetition transmission occasions of the d repetition occasions of the first element, wherein d is a positive integer greater than 1.

18. The communication node of claim 12, wherein the TCI state mapping table meets at least one of:

the TCI state mapping table corresponding to a frequency bandwidth where the first element is located;

the TCI state mapping table corresponding to a CORESET group where the downlink control channel that schedules the first element is located; or a TCI state set consisting of TCI states comprised in the TCI state mapping table comprises at least one TCI state comprising a quasi-co-location reference signal associating with a spatial receiving parameter.

19. The communication node of claim 12, wherein, in a case where the time interval between the downlink control channel that schedules the first element and the first element is less than the predetermined threshold and the first element comprising a plurality of transmission occasions, wherein the time interval is a time interval between the downlink control channel that schedules the first element and a first transmission occasion of the first element.

20. The communication node of claim 12, the processor further configured to:

in a case where the downlink control channel that schedules the PDSCH and the PDSCH are in different CCs, a third information is determined based on signaling information, the third information comprising at least one of: whether the downlink control channel that schedules the PDSCH comprising TCI indication information, or whether a time interval between the downlink control channel that schedules the PDSCH and the PDSCH is less than a first predetermined threshold.

\* \* \* \* \*